United States Patent
Suito et al.

(10) Patent No.: US 7,620,105 B2
(45) Date of Patent: *Nov. 17, 2009

(54) INFORMATION PROCESSING APPARATUS, INFORMATION PROCESSING METHOD, AND DISTRIBUTION MEDIA

(75) Inventors: Taro Suito, Kanagawa (JP); Masashi Ohta, Tokyo (JP); Katsunari Miyata, Tokyo (JP)

(73) Assignee: Sony Corporation, Tokyo (JP)

( * ) Notice: Subject to any disclaimer, the term of this patent is extended or adjusted under 35 U.S.C. 154(b) by 526 days.

This patent is subject to a terminal disclaimer.

(21) Appl. No.: 11/136,356

(22) Filed: May 25, 2005

(65) Prior Publication Data

US 2005/0223403 A1    Oct. 6, 2005

Related U.S. Application Data

(62) Division of application No. 09/448,836, filed on Nov. 23, 1999, now Pat. No. 6,937,658.

(30) Foreign Application Priority Data

Nov. 30, 1998    (JP) .................................. 10-339274

(51) Int. Cl.
  *H04B 1/66*    (2006.01)
(52) U.S. Cl. ................................. 375/240.15
(58) Field of Classification Search ................. 348/700, 348/669, 699, 553, 554, 571, 907; 386/46, 386/1, 102, 48, 125, 110; 375/240.12–240.25; *H04B 1/66*
  See application file for complete search history.

(56) References Cited

U.S. PATENT DOCUMENTS

| | | | |
|---|---|---|---|
| 5,151,788 A | 9/1992 | Blum | |
| 5,333,091 A | 7/1994 | Iggulden et al. | |
| 5,371,795 A * | 12/1994 | Vogel | 725/14 |
| 5,455,630 A | 10/1995 | McFarland et al. | |
| 5,692,093 A | 11/1997 | Iggulden et al. | |
| 5,696,866 A | 12/1997 | Iggulden et al. | |
| 5,748,263 A * | 5/1998 | Ball | 348/734 |
| 5,812,732 A | 9/1998 | Dttmer et al. | |
| 5,987,210 A | 11/1999 | Iggulden et al. | |
| 5,999,688 A * | 12/1999 | Iggulden et al. | 386/46 |
| 5,999,689 A * | 12/1999 | Iggulden | 386/46 |

(Continued)

FOREIGN PATENT DOCUMENTS

JP    8-317342    11/1996

(Continued)

*Primary Examiner*—Tung Vo
(74) *Attorney, Agent, or Firm*—Oblon, Spivak, McClelland, Maier & Neustadt, L.L.P.

(57) ABSTRACT

An information processing apparatus capable of accurately detecting commercials included in a television broadcast. A commercial candidate section detector detects a commercial candidate section based on the characteristics of transitions between a program and a commercial and based on the characteristics of commercials. Transitional criteria include quiet sections, scene change points and changes in the audio multiplex mode. A commercial block detector detects a commercial block, which is composed of a plurality of commercial sections and is interposed between program portions, in conformity with the number of frames of the individual commercial candidate sections detected by the commercial candidate section detector, and then outputs to a switch a control signal based on the result of such commercial block detection.

5 Claims, 29 Drawing Sheets

U.S. PATENT DOCUMENTS

| | | | |
|---|---|---|---|
| 6,002,443 A * | 12/1999 | Iggulden | 348/553 |
| 6,100,941 A | 8/2000 | Dimitrova et al. | |
| 6,137,544 A | 10/2000 | Dimitrova et al. | |
| 6,160,950 A * | 12/2000 | Shimazaki et al. | 386/46 |
| 6,275,646 B1 | 8/2001 | Tada et al. | |
| 6,285,818 B1 | 9/2001 | Suito et al. | |
| 6,343,179 B1 * | 1/2002 | Suito et al. | 386/46 |
| 6,449,021 B1 | 9/2002 | Ohta et al. | |
| 6,459,735 B1 | 10/2002 | Suito et al. | |
| 6,469,749 B1 * | 10/2002 | Dimitrova et al. | 348/722 |
| 6,493,878 B1 | 12/2002 | Kassatly | |
| 6,516,090 B1 * | 2/2003 | Lennon et al. | 382/173 |
| 6,937,658 B1 * | 8/2005 | Suito et al. | 375/240.15 |

FOREIGN PATENT DOCUMENTS

| | | |
|---|---|---|
| JP | 9-219835 | 8/1997 |
| JP | 10-224722 | 8/1998 |

* cited by examiner

FIG. 13

```
                          CURRENT FRAME              ONE-MINUTE
                            ┌--PRECEDING FRAME       PREVIOUS FRAME ┐
                            │ →                                     →
                            ↓
No_Sound    [ ]   0111100011100011110000110...........00001111000011
Scene_Change[ ]   00100000010000001000000100...........10000010000001
Audio_Multi [ ]   111111111111111110000000000...........000011111111111
```

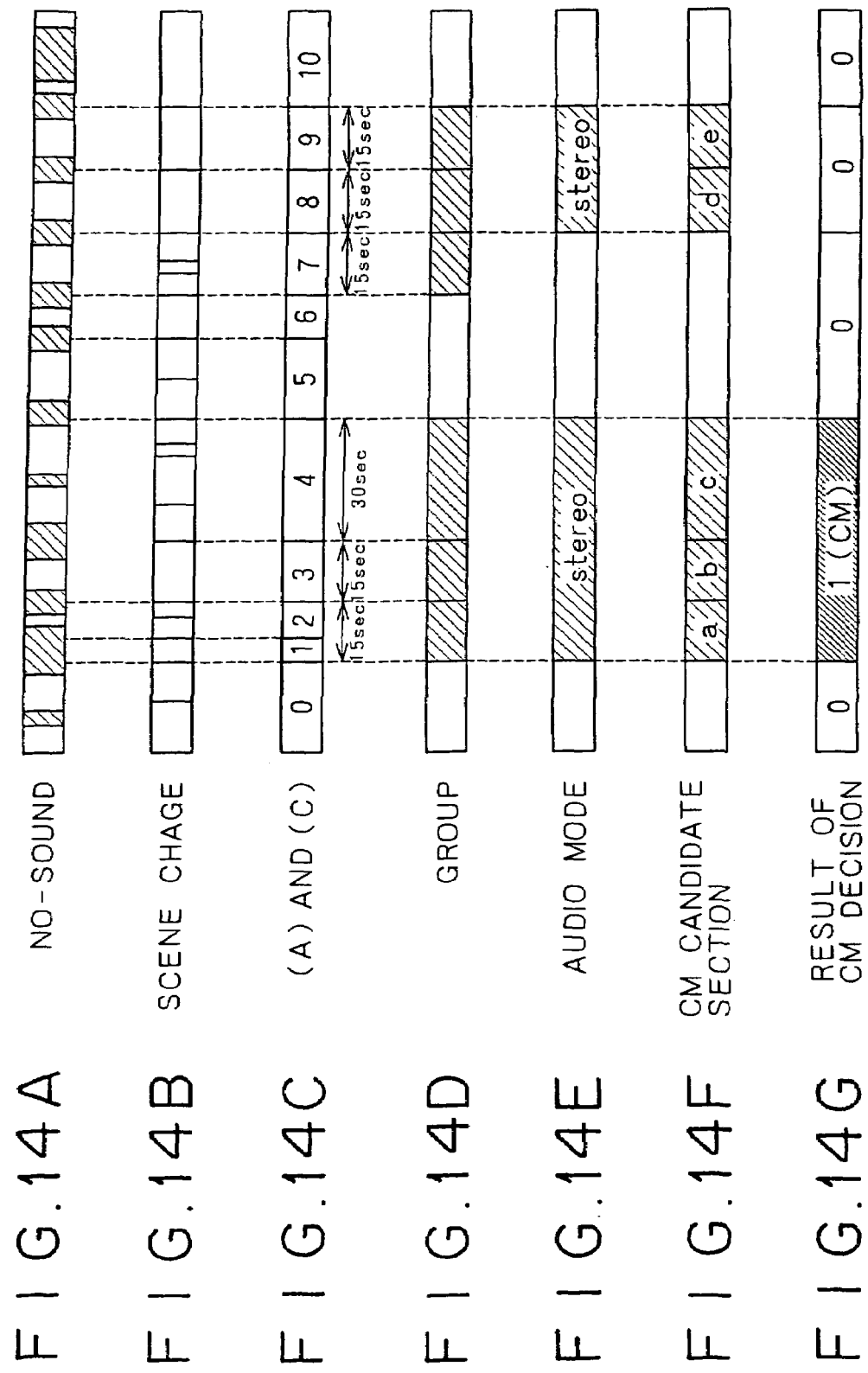

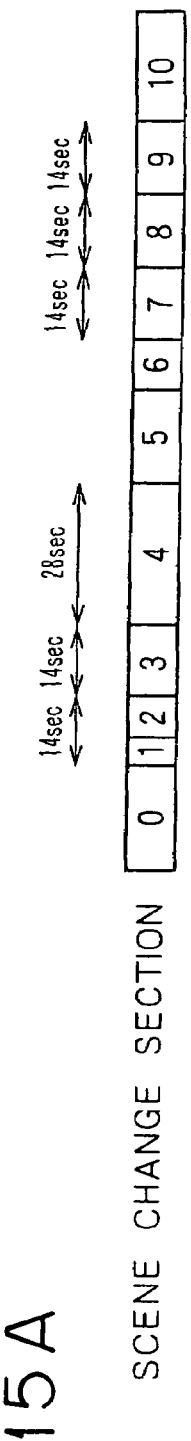
F I G. 15A  SCENE CHANGE SECTION
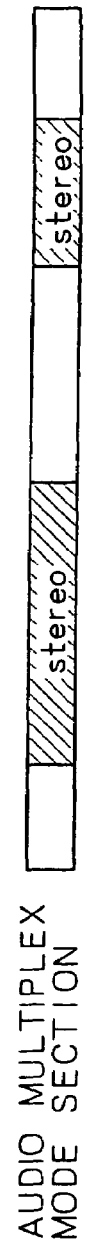
F I G. 15B  AUDIO MULTIPLEX MODE SECTION
F I G. 15C  CM CANDIDATE SECTION

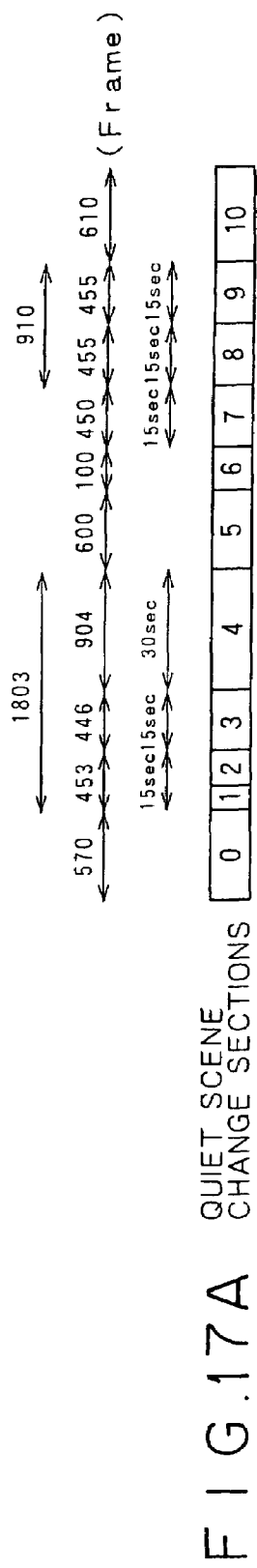
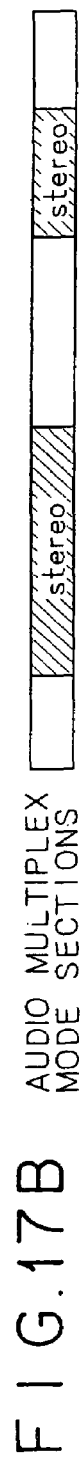
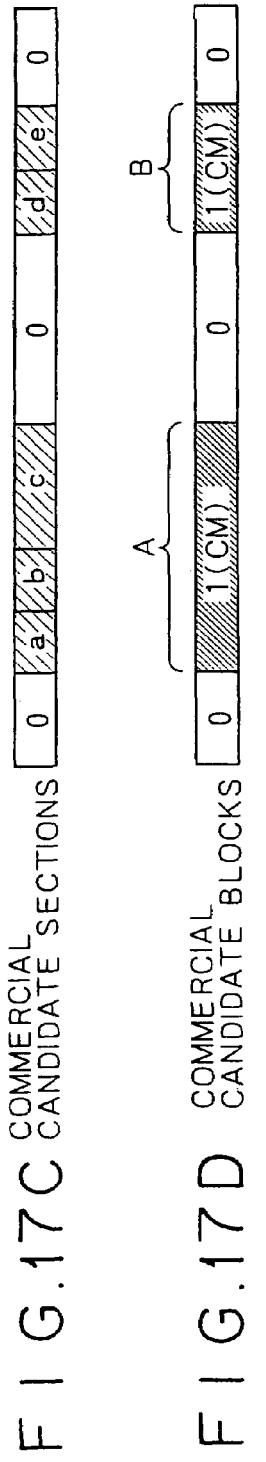
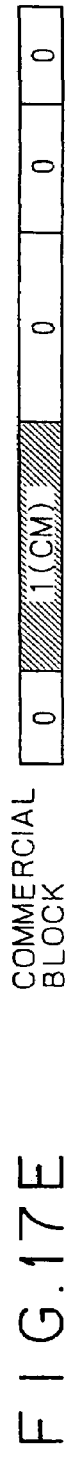
FIG. 17A  QUIET SCENE CHANGE SECTIONS
FIG. 17B  AUDIO MULTIPLEX MODE SECTIONS
FIG. 17C  COMMERCIAL CANDIDATE SECTIONS
FIG. 17D  COMMERCIAL CANDIDATE BLOCKS
FIG. 17E  COMMERCIAL BLOCK

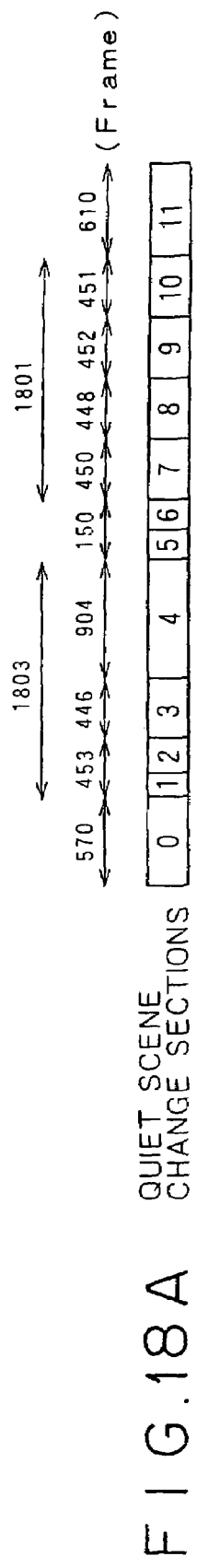
FIG.18A QUIET SCENE CHANGE SECTIONS
FIG.18B AUDIO MULTIPLEX MODE SECTIONS
FIG.18C COMMERCIAL CANDIDATE SECTIONS
FIG.18D COMMERCIAL CANDIDATE BLOCKS
FIG.18E COMMERCIAL BLOCK

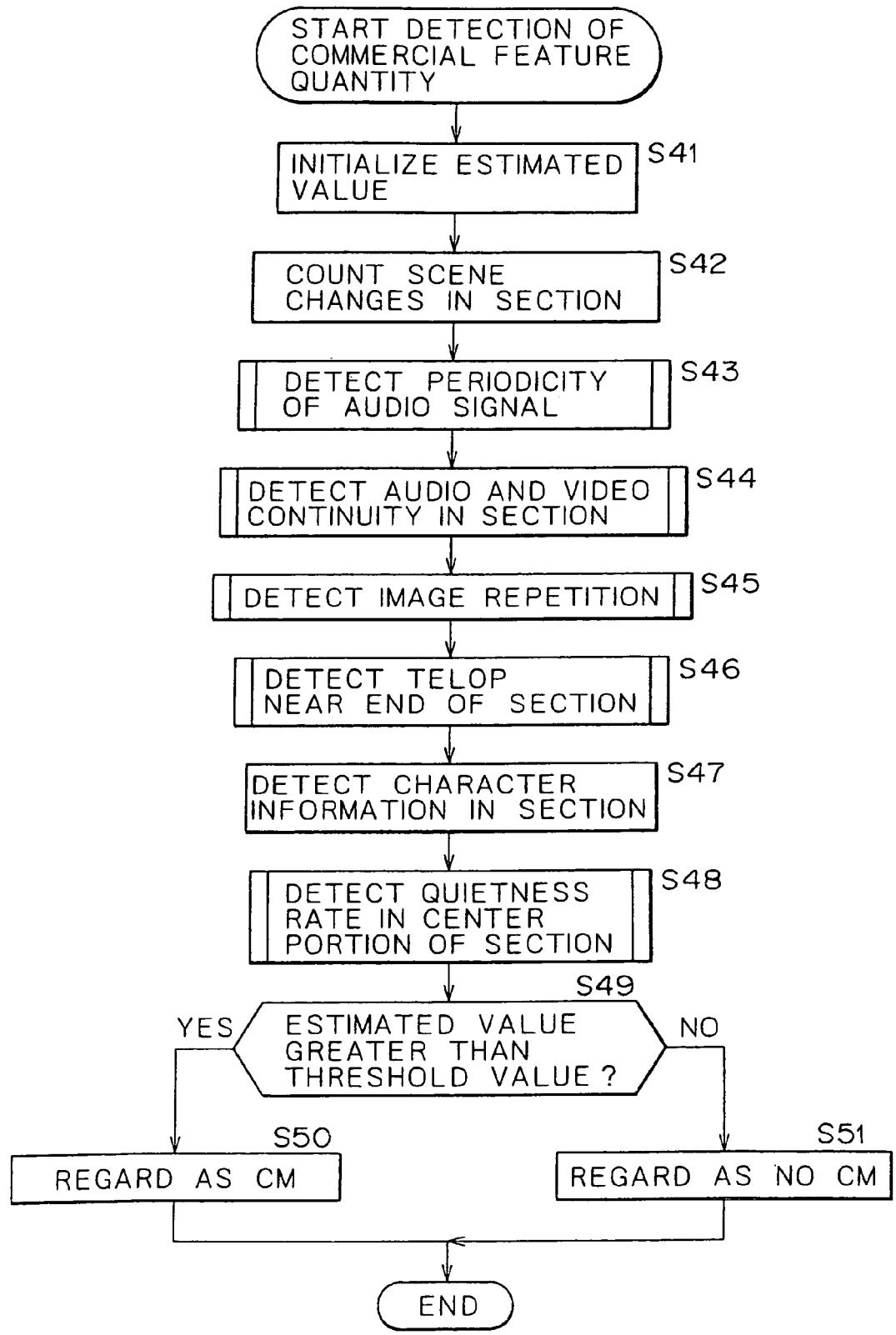

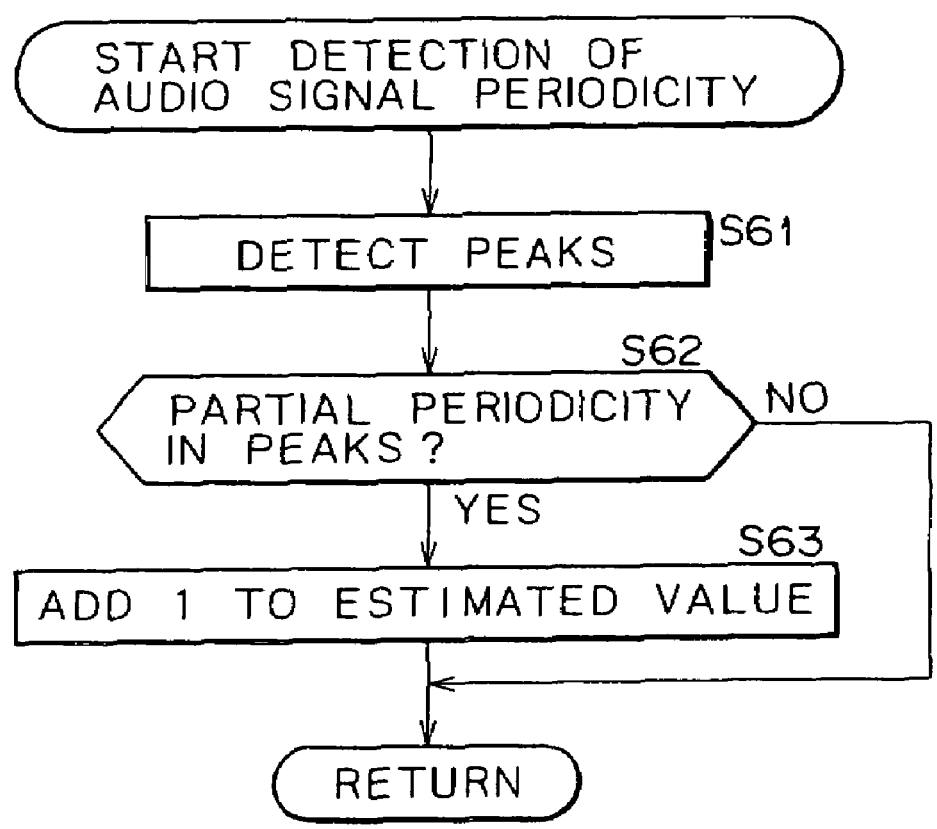

INFORMATION PROCESSING APPARATUS, INFORMATION PROCESSING METHOD, AND DISTRIBUTION MEDIA

CROSS-REFERENCES TO RELATED APPLICATIONS

This application is a divisional application of application Ser. No. 09/448,836, filed Nov. 23, 1999, now allowed, which claims priority to Japanese Application No. P10-339274, filed Nov. 30, 1998, the entire contents of which are incorporated herein by reference. In addition, the present application is related to application Ser. Nos. 09/448,838 and 09/447,496, the contents of which are incorporated herein by reference.

BACKGROUND OF THE INVENTION

The present invention relates to an information processing apparatus, an information processing method and a provision medium, and more particularly to those adapted for detecting a commercial advertisement (herein referred to as a "commercial" or a "CM") included in a television broadcast.

When reproducing a recorded television broadcast, some users want to watch only the program itself without any commercials. In order to satisfy this desire, there are known video recorders equipped with a commercial cut function to skip commercials by fast forwarding.

A typical commercial detection algorithm employed in such a video recorder is based on the following characteristics common to most commercials. That is, a quiet section of 0.1 to 2.0 seconds is at the start and end of each commercial; image scene change points are in the quiet section; the required time of each commercial is an integral multiple of 15 seconds; and (e.g., for commercials broadcast outside of the United States) the audio multiplex mode changes from a monaural mode for programs to a stereo mode for commercials. In television broadcasts in Europe and America, black or blue frames are typically inserted between a program and a commercial. Upon confirmation of such characteristics, the relevant portion is detected as a commercial.

Therefore, according to the known commercial detection algorithms, it is impossible to detect any commercial that holds none of the above characteristics, e.g., a Japanese commercial where the audio multiplex mode is monophonic.

Another problem according to the known commercial detection algorithm is that, in case the above characteristics are included in the program, the relevant portion thereof is detected as a commercial.

Further, if any characteristic of the commercials employed in the known algorithm were changed or abolished (for example, if the required commercial time were changed to an integral multiple of 14 seconds or if the insertion of black or blue frames were abolished in Europe and America), there would arise a problem that commercials would be rendered undetectable.

In a quiet section detection method adopting the known commercial detection algorithm, a quiet section is detected by first calculating the average audio level in a certain section and, if the calculated average level is below a predetermined threshold value, regarding the relevant section as a quiet one. Consequently, the precision of such quiet section detection becomes different when the television reception is not satisfactory, i.e., if the radio field intensity is low and the S/N of the audio signal is inferior, or if the radio field intensity is not low. Under such circumstances, accurate detection of commercials may be impossible.

Moreover, according to the known commercial detection algorithms, the required commercial time is clocked by counting the number of frames on the basis of approximately 30 frames per second. However, since an error of several frames is often caused in an actual broadcast, a margin of error is provided in the threshold value for decision of the required time. Consequently, erroneous detection or non-detection of the commercial may be caused by this margin of error.

In addition to the above, there arises a further problem that, when a television station advertisement spot of 5 seconds or so is broadcast between a commercial and a program, such spot fails to be detected as it has no characteristic of commercials, although it may be perceived as a commercial by television viewers.

SUMMARY OF THE INVENTION

It is an object of the invention to provide a method, apparatus and computer program for correctly detecting commercials contained in television broadcasts.

It is a further object of the present invention to reduce or eliminate the need to view commercials when reproducing previously recorded television broadcasts.

It is a feature of the present invention to stop recording of a television broadcast when a commercial is detected.

It is an additional feature of the present invention to instead index commercials when recording a television broadcast in order to permit the high speed fast forwarding through such commercials, yet preserve the ability to view such commercials according to the wishes of a viewer.

It is an advantage of the present invention to reduce the amount of time a viewer must spend in viewing a desired television program.

It is a further advantage of the present invention to reduce the amount of recording media storage space necessary to record a desired television program, by not recording commercials interspersed with the desired television program.

It is yet another advantage of the present invention to allow a viewer to index commercials to permit the viewing of such commercials when desired by the viewer.

According to one aspect of the invention, there is provided an apparatus for processing a television signal which includes: means for receiving a television signal; means for detecting a commercial candidate block which consists of one or more commercial candidate sections in the television signal; means for measuring a length of the commercial candidate block; means for making a first judgement of whether the length of the commercial candidate block is within a predetermined range of an integral multiple of a standard length; and means for determining whether the commercial candidate block is a commercial block according to the first judgement.

According to another aspect of the invention, there is provided an apparatus for processing a television signal which includes: means for receiving a television signal; means for detecting a commercial candidate section in the television signal; means for measuring a length of the commercial candidate section; means for making a first judgement of whether the length of the commercial candidate section is within a first predetermined range of an integral multiple of a standard length; means for measuring the length of an intermediate section between commercial candidate sections; means for making a second judgement of whether the length of the intermediate section is within a second predetermined range; and means for determining a commercial block of one or more commercial candidate sections according to the first judgement and the second judgement.

According to another aspect of the invention, there is provided an apparatus for processing a television signal which includes: means for receiving a television signal; means for extracting a commercial based on a reference criterion indicative of a commercial characteristic; means for detecting an alteration of the commercial characteristic; and means for changing the reference criterion according to the alteration of the commercial characteristic detected by the alteration detecting means.

According to another aspect of the invention, there is provided an apparatus for processing a television signal which includes: a receiver for receiving a television signal; a first detector for detecting a commercial candidate block which consists of one or more commercial candidate sections in the television signal; a measuring circuit for measuring a length of the commercial candidate block; a comparitor for making a comparison of whether the length of the commercial candidate block is within a predetermined range of an integral multiple of a standard length; and a second detector for determining whether the commercial candidate block is a commercial block according to the comparison.

According to another aspect of the invention, there is provided an apparatus for processing a television signal which includes: a receiver for receiving a television signal; a detector for detecting a commercial candidate section in the television signal; a timer for measuring a length of the commercial candidate section and for measuring the length of an intermediate section between commercial candidate sections; a first comparitor for making a first comparison of whether the length of the commercial candidate section is within a first predetermined range of an integral multiple of a standard length; a second comparitor for making a second comparison of whether the length of the intermediate section is within a second predetermined range; and a commercial block detector for detecting a commercial block of one or more commercial candidate sections according to the first comparison and the second comparison.

According to another aspect of the invention, there is provided an apparatus for processing a television signal which includes: a receiver for receiving a television signal; a commercial extracting circuit for extracting a commercial based on a reference criterion indicative of a commercial characteristic; a detector for detecting an alteration of the commercial characteristic; and an updating circuit for updating the reference criterion according to the alteration of the commercial characteristic detected by the detector.

According to another aspect of the invention, there is provided a method of processing information in an information processing apparatus for detecting commercials included in a television broadcast, wherein the method includes: receiving a television signal; detecting a commercial candidate block which consists of one or more commercial candidate sections in the television signal; measuring a length of the commercial candidate block; making a judgement of whether the length of the commercial candidate block is within a predetermined range of an integral multiple of a standard length; and determining whether the commercial candidate block is a commercial block according to the judgement.

According to another aspect of the invention, there is provided a method for processing a television signal which includes: a signal receiving step of receiving a television signal; a commercial candidate section detecting step of detecting a commercial candidate section in the television signal; a first measuring step of measuring a length of the commercial candidate section; a first judgement step of making a first judgement of whether the length of the commercial candidate section is within a first predetermined range of an integral multiple of a standard length; a second measuring step of measuring the length of an intermediate section between commercial candidate sections; a second judgement step of making a second judgement of whether the length of the intermediate section is within a second predetermined range; and a commercial block determining step of determining a commercial block of one or more commercial candidate sections according to the first judgement and the second judgement.

According to another aspect of the invention, there is provided a provision medium for providing a program which is readable by a computer to control an apparatus to execute a detection routine for detecting commercials included in a television broadcast, the detection routine including the steps of: receiving a television signal; detecting a commercial candidate block which consists of one or more commercial candidate sections in the television signal; measuring a length of the commercial candidate block; making a judgement of whether the length of the commercial candidate block is within a predetermined range of an integral multiple of a standard length; and determining whether the commercial candidate block is a commercial block according to the judgement.

According to another aspect of the invention, a provision medium provides a program which is readable by a computer to control an apparatus to execute a detection routine for detecting commercials included in a television broadcast, wherein the detection routine includes the following steps: receiving a television signal; detecting a commercial candidate section in the television signal; measuring a length of the commercial candidate section; making a first judgement of whether the length of the commercial candidate section is within a first predetermined range of an integral multiple of a standard length; measuring the length of an intermediate section between commercial candidate sections; making a second judgement of whether the length of the intermediate section is within a second predetermined range; and determining a commercial block of one or more commercial candidate sections according to the first judgement and the second judgement.

According to another aspect of the invention, a provision medium provides a program which is readable by a computer to control an apparatus to execute a detection routine for detecting commercials included in a television broadcast, wherein the detection routine includes the following steps: receiving a television signal; extracting a commercial based on a reference criterion indicative of a commercial characteristic; detecting an alteration of the commercial characteristic; and changing the reference criterion according to the alteration of the commercial characteristic detected in the alteration detecting step.

These and other objects, features and advantages will become apparent when considered with reference to the following description and the accompanying drawings.

BRIEF DESCRIPTION OF THE DRAWINGS

FIG. 13 is a diagram for explaining the information which may be recorded in an internal memory of a second embodiment of the commercial candidate section detector;

FIGS. 14A to 14G are diagrams for explaining a routine executed by a second embodiment of the commercial candidate section detector;

FIGS. 15A to 15C are diagrams for explaining a routine executed by a first embodiment of the commercial candidate section detector;

FIGS. 17A to 17E are diagrams for explaining a routine executed by the commercial block detector of FIG. 16;

FIGS. 18A to 18E are diagrams for explaining a routine executed by the commercial detection circuit of FIG. 1;

FIG. 20 is a flowchart for explaining the operation of a commercial characteristic quantity detector of FIG. 19;

FIG. 21 is a flowchart for explaining a routine of audio signal periodicity detection executed at step S43 of FIG. 20;

DESCRIPTION OF THE PREFERRED EMBODIMENTS

Figure 1:
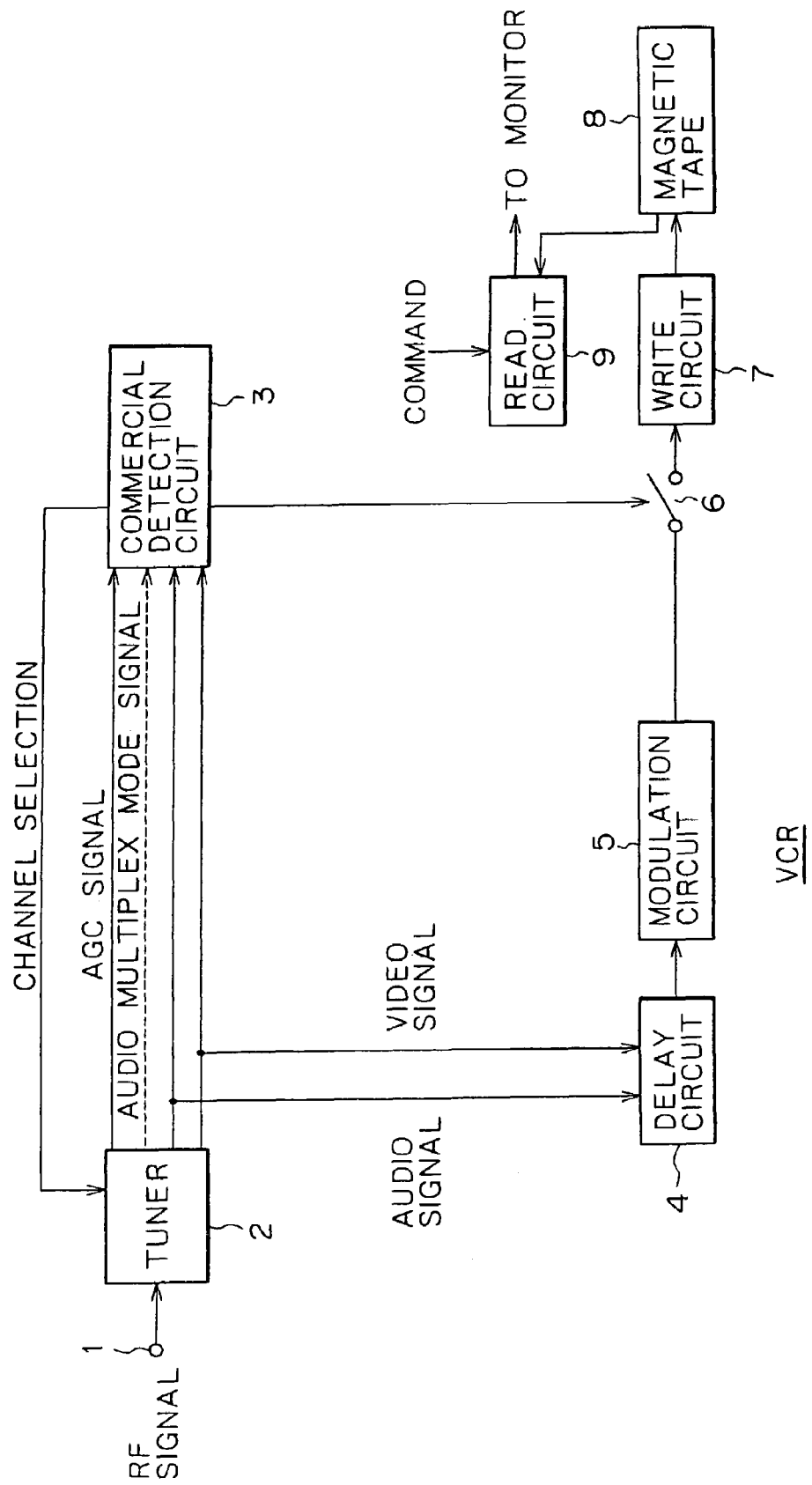
FIG. 1 is a block diagram showing a first structural example of a video recorder where the present invention is applied.

Referring now to FIG. 1, a description will be given of a first structural example of a video recorder where the present invention is applied. Tuner 2 in a recording unit demodulates the RF signal of a television broadcast inputted from a terminal 1 to thereby obtain a video signal, an audio signal, an AGC signal and a signal indicative of an audio multiplex mode (hereinafter referred to simply as an audio multiplex mode signal), and then supplies these signals to commercial detection circuit 3. Further, tuner 2 also supplies the video signal and the audio signal to delay circuit 4.

Commercial detection circuit 3 makes a decision as to whether the signals from tuner 2 represent a commercial or not, and then outputs control signal 0 or 1 to switch 6 in accordance with the result of such decision. Switch 6 is turned on in response to a control signal 1 or is turned off in response to a control signal 0.

Delay circuit 4 delays the input video and audio signals from tuner 2 by a time period required for execution of the processing routine in commercial detection circuit 3 (e.g., one minute in this embodiment), and then supplies the delayed signals to a modulation circuit 5. Subsequently, modulation circuit 5 compresses and encodes the input video and audio signals from delay circuit 4 into a predetermined format (e.g., MPEG2 format) and, after modulating the signals by a predetermined modulation method (e.g., EFM), supplies the modulated signals to a write circuit 7 via switch 6. Then, write circuit 7 records the input modulated signals on magnetic tape 8.

In response to a command from a user, read circuit 9 in a reproducing unit reads and demodulates the signals recorded on magnetic tape 8, and then supplies the demodulated signals to a monitor (not shown).

The medium used for recording such video and audio signals is not limited to a magnetic tape alone. For example, the medium may be an optical disk, a magneto-optical disk, a hard disk, or a semiconductor memory.

Figure 2:
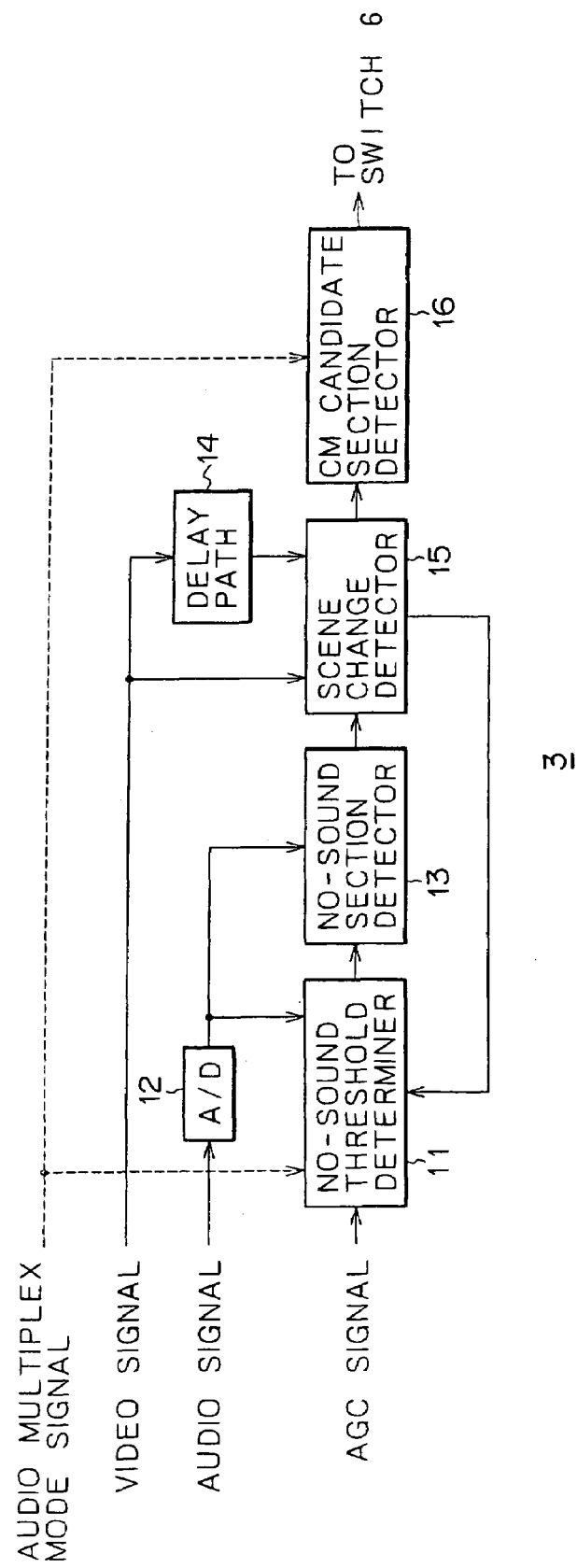
FIG. 2 is a block diagram showing a first structural example of a commercial detection circuit of FIG. 1.

FIG. 2 shows a first embodiment of commercial detection circuit 3 of FIG. 1. In this commercial detection circuit 3, the audio multiplex mode signal inputted from tuner 2 is supplied to both quiet threshold determiner 11 and commercial candidate section detector 16; the video signal is supplied to a delay path 14 and a scene change detector 15; the audio signal is supplied to an A/D converter 12; and the AGC signal is supplied to quiet threshold determiner 11.

Quiet threshold determiner 11 calculates a threshold value, which is to be used for detection of a quiet section, on the basis of the audio multiplex mode signal, the audio signal digitized by A/D converter 12, the AGC signal or the signal inputted from scene change detector 15, or any combination of these, and then supplies the threshold value to quiet section detector 13.

Quiet section detector 13 detects the quiet section by comparing the level of the digital audio signal obtained from A/D converter 12 with the threshold value supplied from quiet threshold determiner 11, and then outputs the result to scene change detector 15.

Scene change detector 15 compares two frame images inputted thereto simultaneously (i.e., the current frame and the preceding frame delayed by a time period of one frame [1/30 second] via delay path 14), thereby detecting the presence or absence of a scene change in the quiet section, and then outputs the result to commercial candidate section detector 16.

In this embodiment, commercial candidate section detector 16 encodes the audio multiplex mode signal and the scene change information supplied from scene change detector 15 into binary information per frame, then stores the same in an internal memory and, after detecting the commercial candidate section on the basis of such information, outputs control signal 1 to switch 6 in the commercial candidate section, or outputs a control signal 0 in any section other than the commercial candidate section. Note that in alternative embodiments, other information may be used to detect a commercial candidate. The information of the preceding minute is stored in the internal memory of commercial candidate section detector 16. In this case, the storage capacity of such internal memory is expressed as 60 (seconds)×30 (frames)×2 (data)×1 (bit).

Next, the operation of commercial detection circuit 3 will be described with reference to a flowchart of FIG. 3. The processing routine of such commercial detection is started upon input of each signal from tuner 2 to commercial detection circuit 3. At step S1, quiet threshold determiner 11 in commercial detection circuit 3 supplies to quiet section detector 13 the threshold value 13 calculated in advance (as will be mentioned later) to be used for the routine of quiet section detection (step S2).

Figure 4:
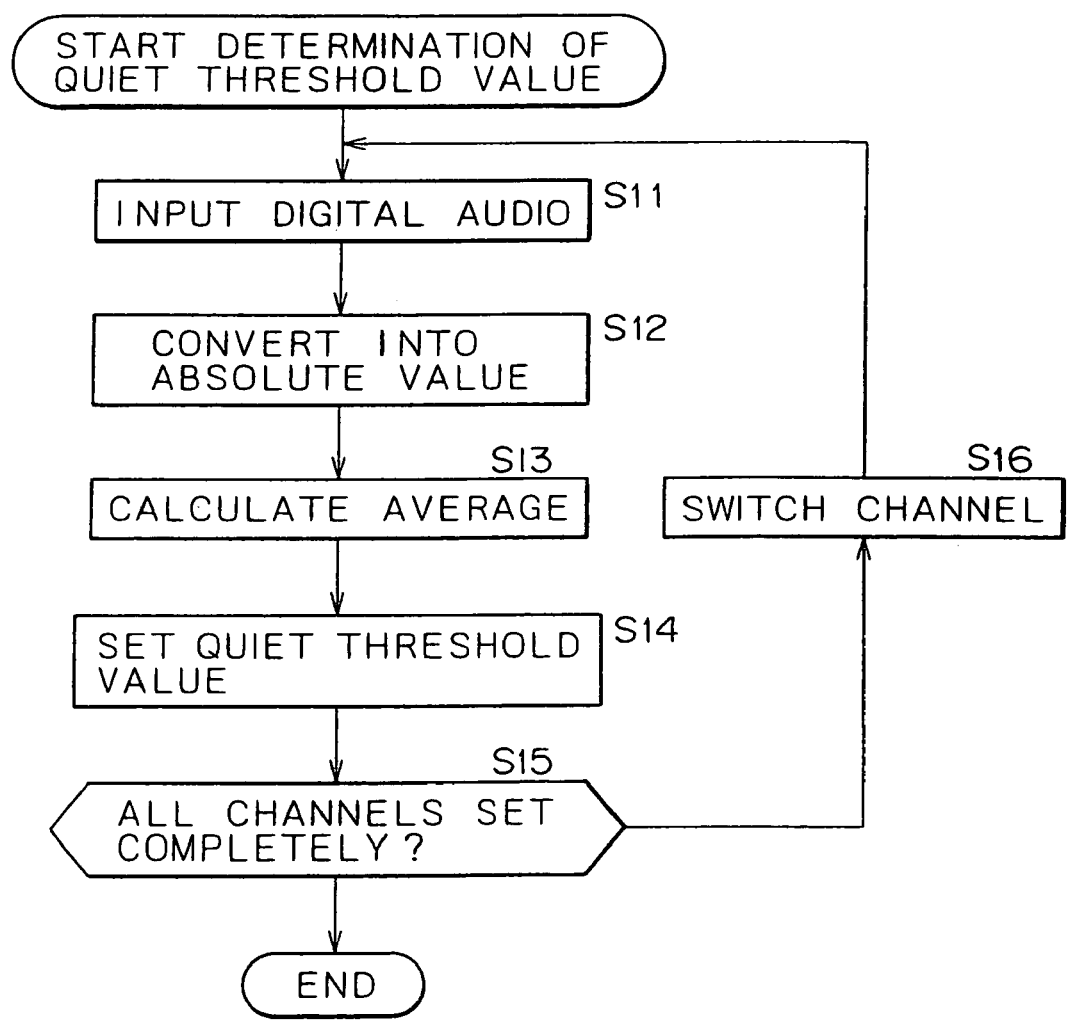
FIG. 4 is a flowchart for explaining the routine executed by a quiet threshold determiner of FIG. 2.

The details of such quiet threshold determination will be described below with reference to a flowchart of FIG. 4. In the following description, quiet threshold value determining unit 11 performs many different functions. In practice, these functions could be performed by one component or by two or more components.

Figure 5:
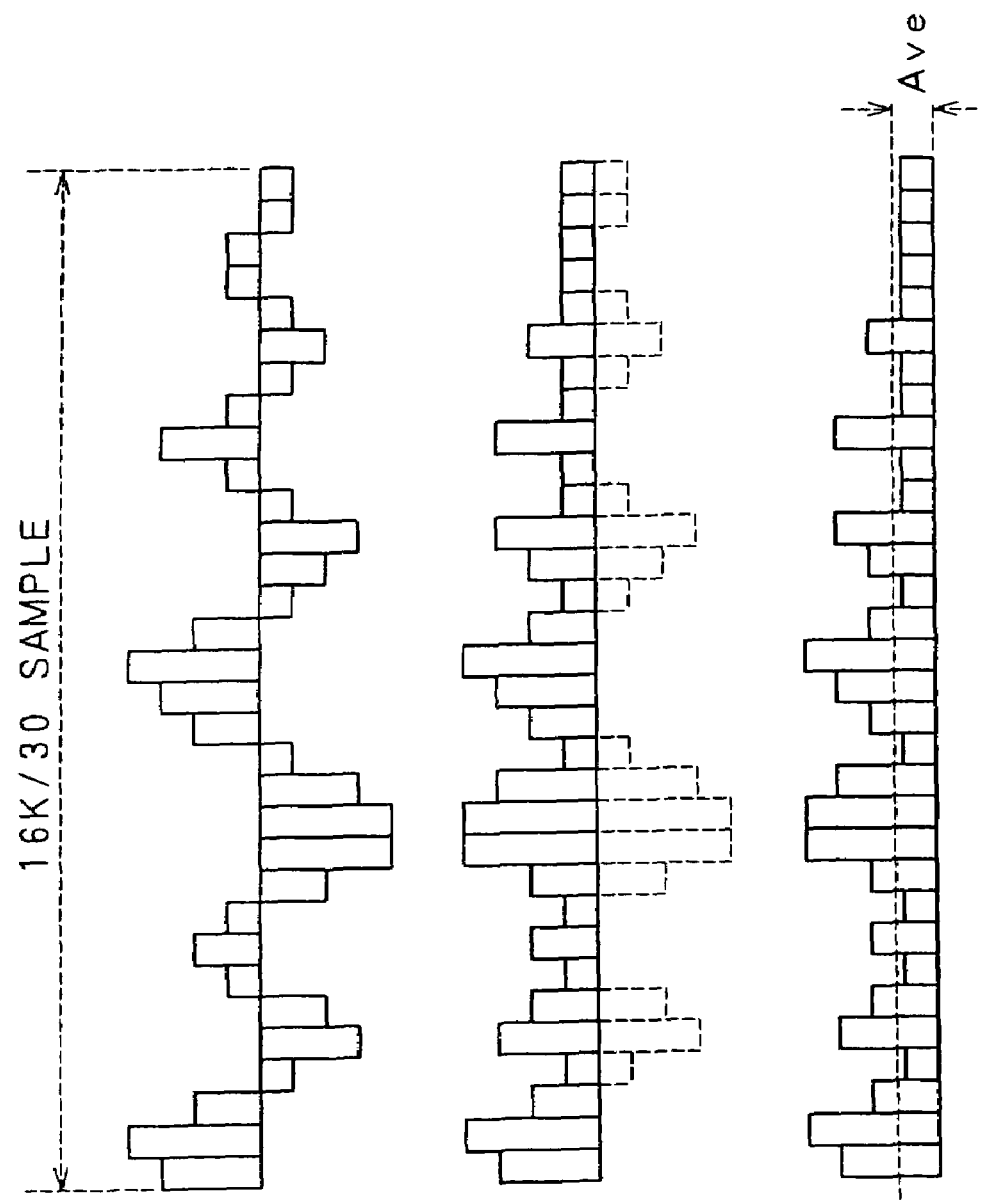
FIGS. 5A to 5C are diagrams for explaining the operation of a quiet threshold determiner of FIG. 2.

At step S11, A/D converter 12 converts the audio signal (analog) of a predetermined short time, which has been inputted from tuner 2, into a digital signal at a predetermined sampling frequency and a predetermined quantization level, and then supplies the digital audio signal (e.g., FIG. 5A) thus obtained to quiet threshold determiner 11. At step S12, quiet threshold determiner 11 converts the digital audio signal inputted from A/D converter 12 into absolute-value samples as shown in FIG. 5B, and then calculates, at step S13, the average value (FIG. 5C) of the absolute-value samples.

Subsequently at step S14, quiet threshold determiner 11 compares the average value obtained at step S13 with the threshold value stored until then, and stores the smaller value as a new threshold value.

At step S15, quiet threshold determiner 11 makes a decision as to whether the processes at steps S11 to S14 have been completely executed or not with regard to all channels. If the result of this decision is negative, signifying that the processes have not yet been executed with regard to all channels, the operation proceeds to step S16. Quiet threshold determiner 11 outputs, at step S16, a channel switching signal to tuner 2, and the channel is switched in response to the channel switching signal.

If the result of the decision at step S15 is affirmative, signifying that the processes at steps S11 to S14 have been completely executed with regard to all channels, the routine of quiet threshold determination is terminated. This routine of quiet threshold determination is executed repeatedly at a predetermined interval of, e.g., 10 minutes.

Figure 6:
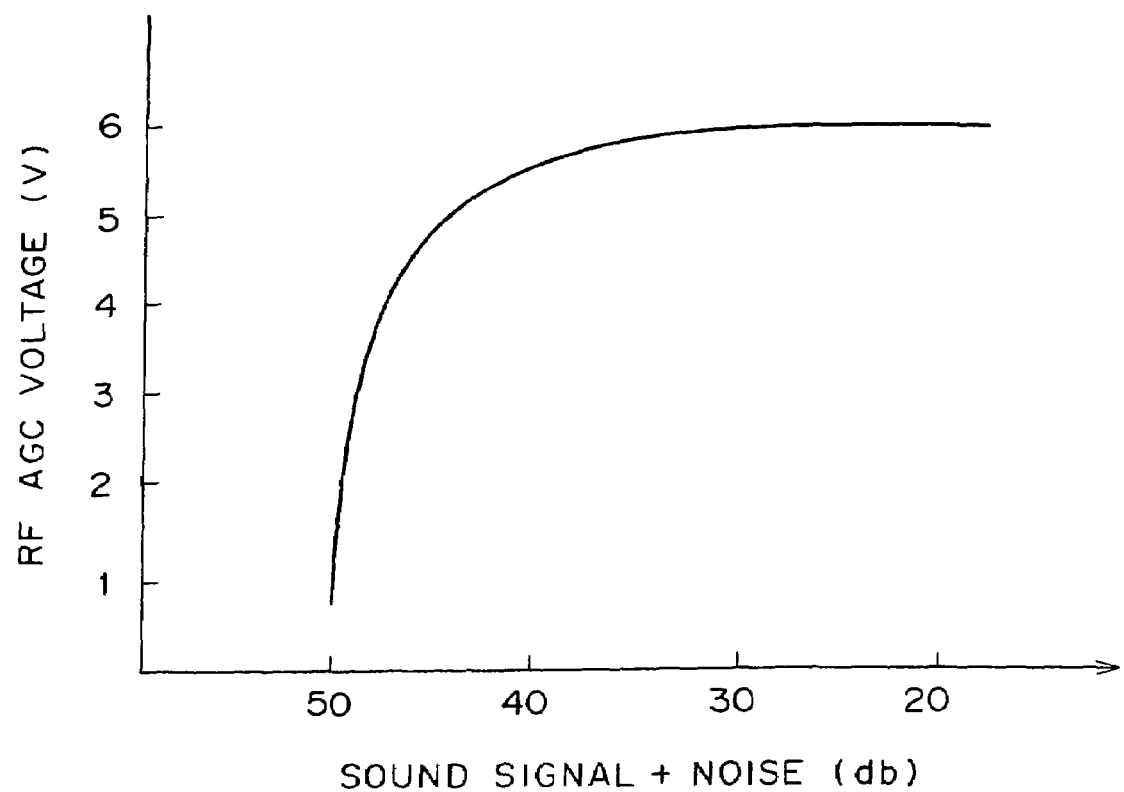
FIG. 6 is a graphic diagram for explaining the operation of a quiet threshold determiner of FIG. 2.

The routine of quiet threshold determination may be executed by some other method than the above. For example, the audio signal may be received at a broadcast start time and a broadcast end time of each channel when the audio signal level becomes zero with certainty while the video signal is existent, and a quiet threshold value may be set to n+Δ which is obtained by adding a predetermined offset value Δ to the audio signal level n. It is supposed here that the broadcast start time and end time of each channel are known in advance. Also, the quiet threshold value may be determined by the use of the AGC signal obtained from tuner 2. More specifically, as shown in FIG. 6, the level of the AGC signal inputted from tuner 2 has a predictable relationship to the amplitude of the audio signal. Therefore, by inferring the amplitude of the audio signal from the level of the AGC signal, it is rendered possible to uniquely determine the threshold value corresponding to the inferred amplitude.

Figure 7:
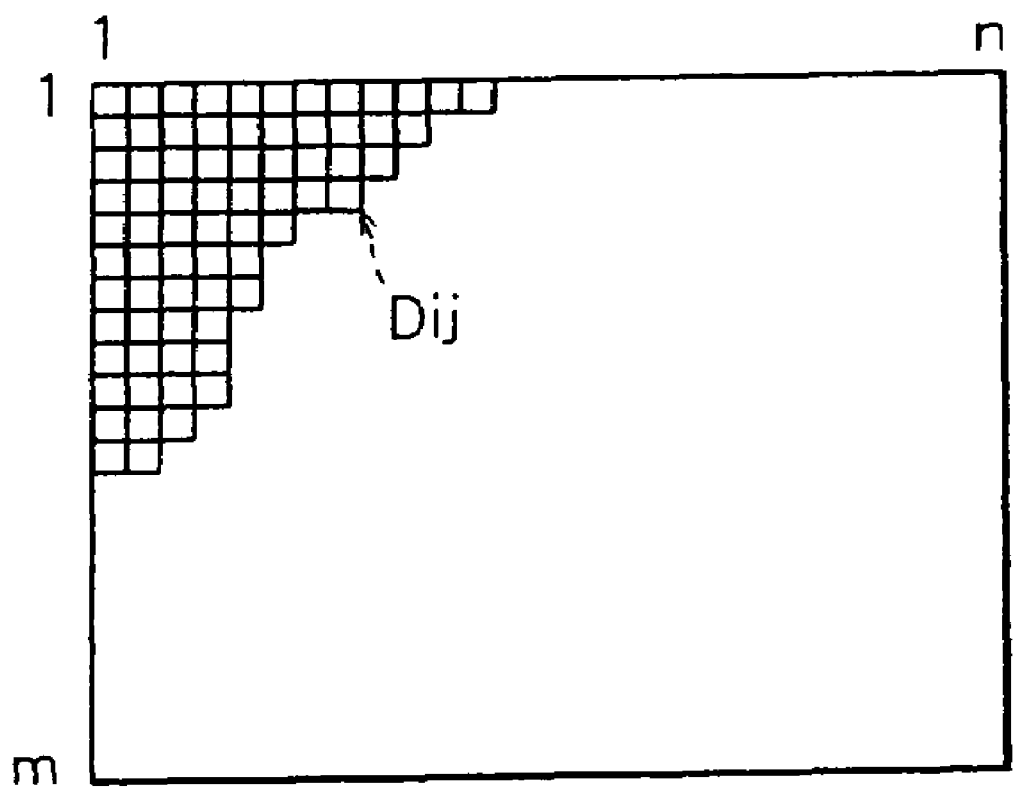
FIG. 7 is a diagram for explaining the operation of a quiet threshold determiner of FIG. 2.

Further, since the buzz component of the audio signal is dependent on the brightness level of the video signal, the quiet threshold value may be determined by using the average value of the video signal luminance level. If the average value of the luminance level is high, for example, the buzz component of the audio signal increases to eventually raise the audio signal level for a fixed period of time. In this case, therefore, the threshold value is set to be higher than the normal value. If the average value of the luminance level is low, the buzz component of the audio signal decreases to eventually lower the audio signal level for a fixed period of time. In this case, therefore, the threshold value is set to be lower than the normal value. The average value $Y_A$ of the video signal luminance is calculated as follows in scene change detector 15:

$$Y_A = (ED_{ij})/n \times m$$

where i=1 to n, j=1 to m, and $D_{ij}$ denotes the pixel value at coordinates (i, j) of the image corresponding to the audio signal, as shown in FIG. 7.

In addition to the above methods, the quiet threshold value may be determined on the basis of the audio multiplex mode signal as well. That is, the quiet threshold value may be set to the audio signal level obtained at the point of switching the audio multiplex mode from a monaural, bilingual broadcast to a stereo broadcast.

Figure 8:
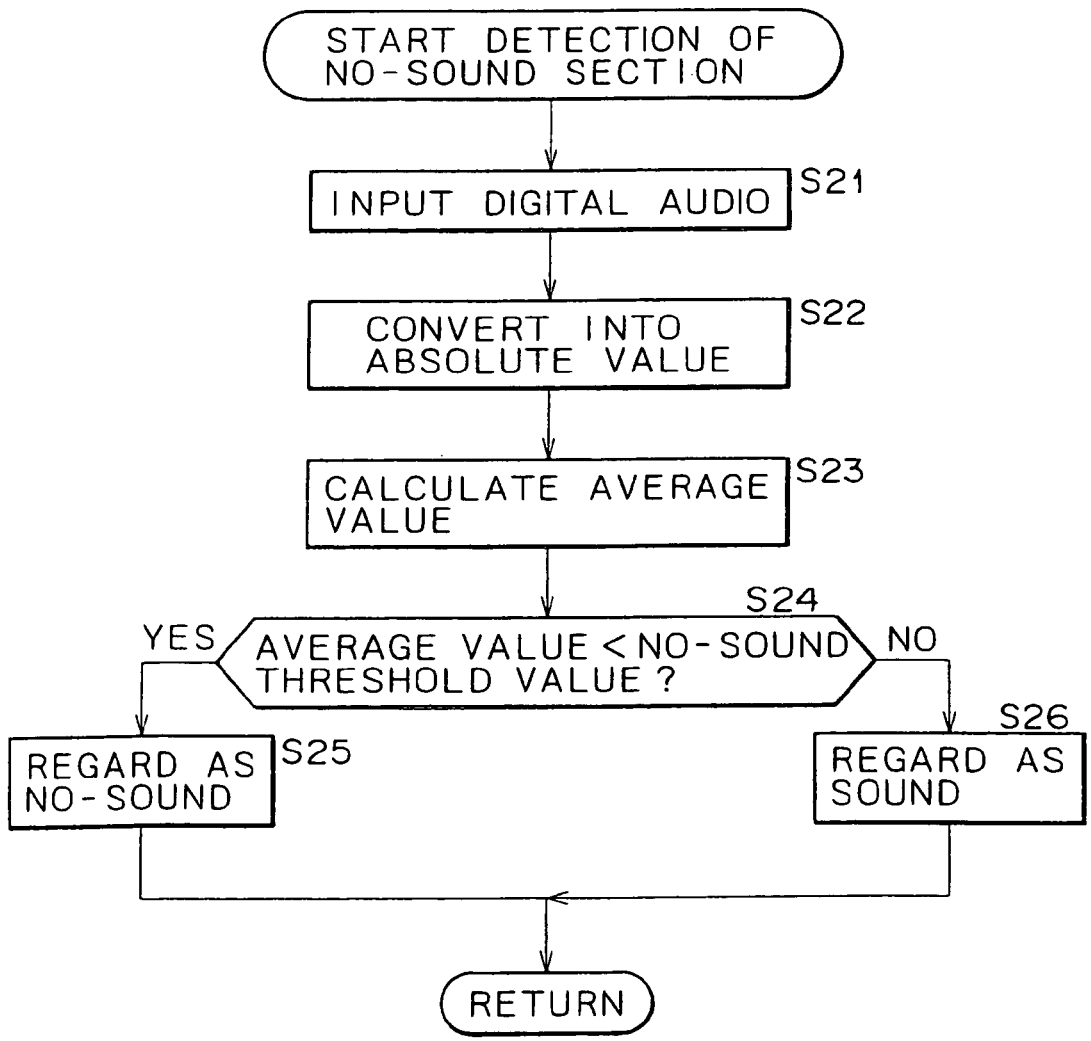
FIG. 8 is a flowchart for explaining a routine of quiet section detection executed at step S2 of FIG. 3.

Referring back to FIG. 3 again, quiet section detector 13 detects, at step S2, the quiet section on the basis of the threshold value inputted from quiet threshold determiner 11 at step S1. The processing routine of this quiet section detection will now be described in detail with reference to a flowchart of FIG. 8.

At step S21, A/D converter 12 converts the audio signal (analog) of a predetermined short time, which has been inputted from tuner 2, into a digital signal at a predetermined sampling frequency and a predetermined quantization level, and then supplies the digital audio signal (e.g., FIG. 5A) thus obtained to quiet threshold determiner 11. At step S22, quiet threshold determiner 11 converts the digital audio signal inputted from A/D converter 12 into absolute-value samples as shown in FIG. 5B, and then calculates, at step S23, the average value (FIG. 5C) of the absolute-value samples.

At step S24, quiet threshold determiner 11 makes a decision as to whether the average value obtained at step S23 is smaller than the threshold value inputted from quiet threshold determiner 11, and if the result of this decision signifies that the average value is smaller than the threshold value, the operation proceeds to step S25. Then quiet section detector 13 regards this section as a quiet section at step S25, and outputs the information thereof to scene change detector 15.

On the contrary, if the result of the decision at step S24 signifies that the average value is not smaller than the threshold value, the operation proceeds to step S26. At step S26, quiet section detector 13 does not regard this as a quiet section and then outputs the information thereof to scene change detector 15.

Figure 3:
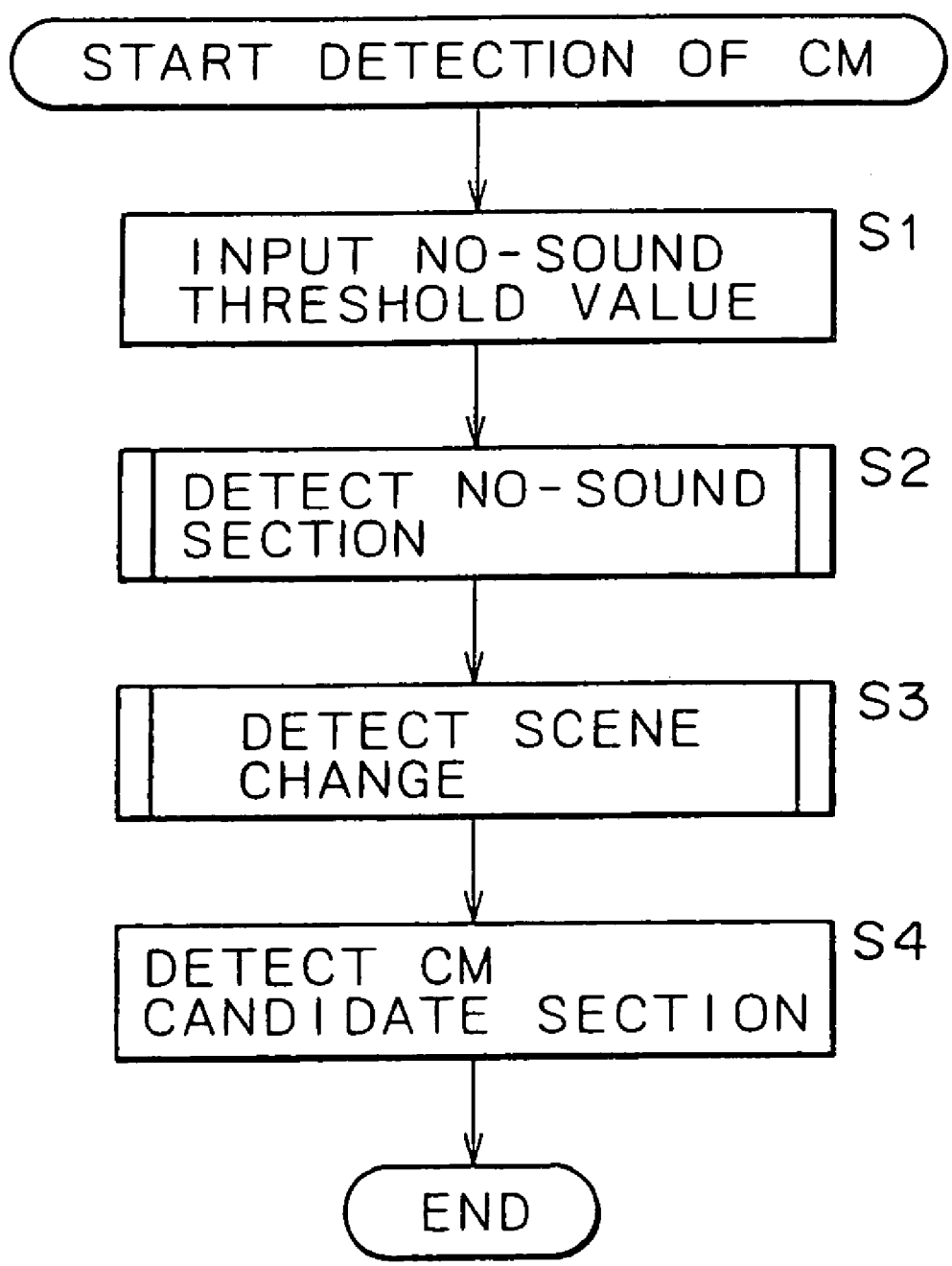
FIG. 3 is a flowchart for explaining the operation of a commercial detection circuit.
Figure 9:
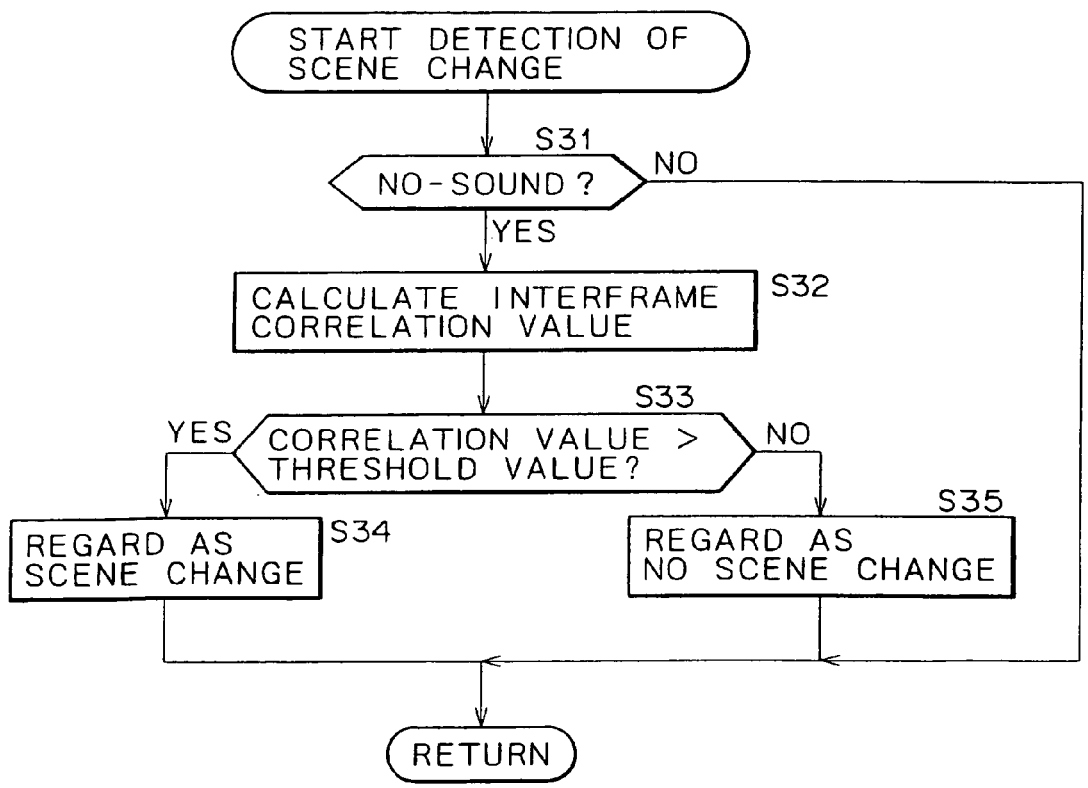
FIG. 9 is a flowchart for explaining a routine of scene change detection executed at step S3 of FIG. 3.

The operation then returns to step S3 in FIG. 3. At step S3, scene change detector 15 detects a scene change in the two successive frames inputted thereto, and outputs the result of such detection to commercial candidate section detector 16. The details of this scene change detection will now be described with reference to a flowchart of FIG. 9.

At step S31, scene change detector 15 makes a decision as to whether the information inputted from quiet section detector 13 indicates a quiet section or not. And if the result of this decision is affirmative (signifying that the input information indicates a quiet section), the operation proceeds to step S32.

Figure 10:
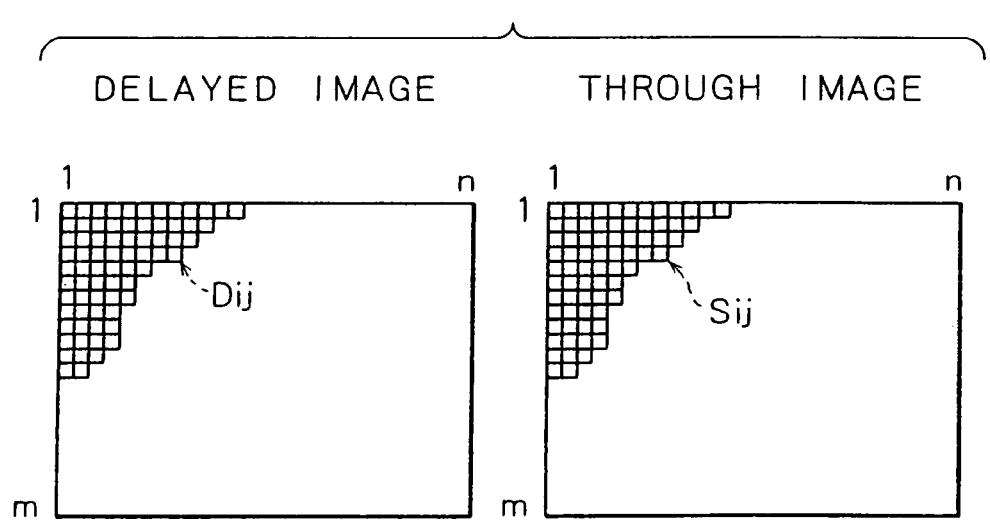
FIG. 10 is a diagram for explaining a routine of scene change detection.

At step S32, scene change detector 15 calculates the inverse correlation value E of the two successive frame images inputted thereto. More concretely, the inverse correlation value E is obtained according to the following equation by summing, as shown in FIG. 10, the absolute values of the differences between the pixel values of the mutually corresponding pixels of the image (delayed image) inputted via delay path 14 and the image (through image) inputted directly:

$$E = \Sigma |D_{ij} - S_{ij}|$$

where $D_{ij}$ and $S_{ij}$ denote, respectively, the pixel values at coordinates (i, j) of the delayed image and those of the through image. The inverse correlation value becomes greater with a decreased interframe correlation, or smaller with an increased interframe correlation.

For calculating the inverse correlation value E, there may also be adopted some other method that uses, for example, histograms of the respective pixel values of the delayed image and the through image, or a method that divides the delayed image and the through image into a predetermined number of blocks and calculates the inverse correlation value per block on the basis of the difference between the pixel values.

At step S33, scene change detector 15 makes a decision as to whether the inverse correlation value obtained at step S32 is greater or not than a predetermined threshold value, and if the result of this decision signifies that the inverse correlation value is greater than the predetermined threshold value (i.e., the interframe correlation degree is low), the operation proceeds to step S34.

Subsequently at step S34, scene change detector 15 concludes that a scene change is existent between the two successive input frames, and then supplies the information thereof to commercial candidate section detector 16.

On the contrary, if the result of the decision at step S33 signifies that the inverse correlation value is not greater than the predetermined threshold value (i.e., the interframe correlation degree is high), the operation proceeds to step S35.

At step S35, scene change detector 15 concludes that there is no scene change between the two successive input frames, and then supplies the information thereof to the commercial candidate detector 16.

In case the result of the decision at step S31 signifies that the information is not indicative of a quiet section, the information is supplied to commercial candidate section detector 16, and then the operation returns to step S4 in FIG. 3.

At step S4, commercial candidate section detector 16 decides the commercial candidate section in accordance with the binary-coded audio multiplex mode signal of the preceding one minute of frames stored in the internal memory, and also with the information obtained from scene change detector 15.

Figure 11:
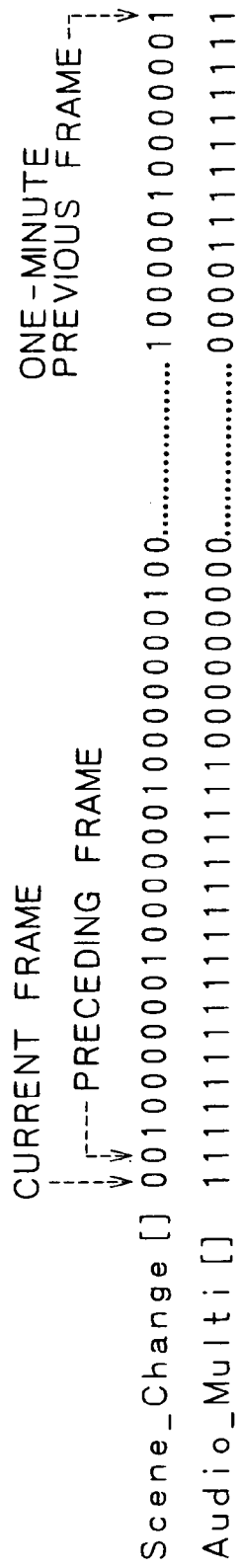
FIG. 11 is a diagram for explaining information which may be recorded in an internal memory of a first embodiment of the commercial candidate section detector.

More specifically, as shown in FIG. 11, the audio multiplex mode signal (Audio_Multi[]) is recorded in the memory incorporated in commercial candidate section detector 16, where 1 denotes a stereo mode, and 0 denotes a monaural mode or a bilingual mode. There is also recorded the information (Scene_Change[ ]) inputted from scene change detector 15, where 1 denotes a frame with a scene change, and 0 denotes a frame without a scene change.

Figure 12:
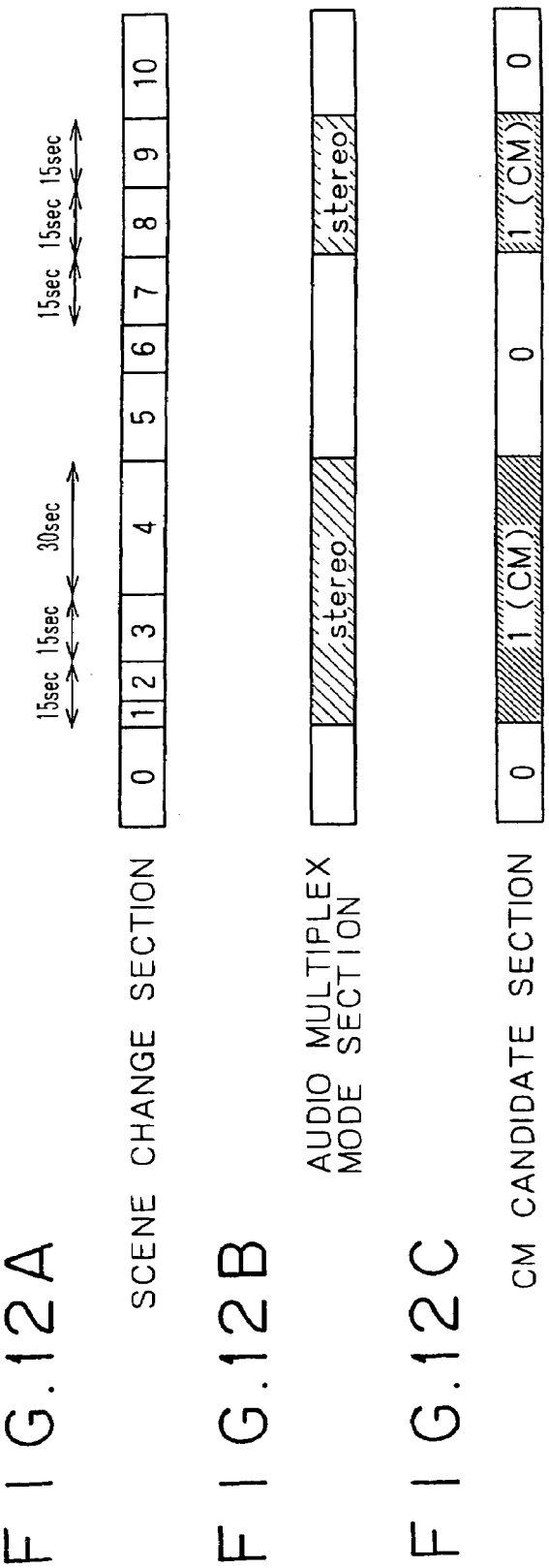
FIGS. 12A to 12C are diagrams for explaining a routine executed by a first embodiment of the commercial candidate section detector.

Referring to the internal memory, commercial candidate section detector 16 partitions into sections (in this example, scene change sections 0 to 10) per frame (scene change point) where the signal indicative of a scene change is 1, as shown in FIG. 12A, and divides the number of the frames constituting each scene change section by 30 thereby calculating the time of the relevant section. Further, as shown in FIG. 12B, commercial candidate section detector 16 regards as a stereo section the consecutive frames where the audio multiplex mode signal is 1. Moreover, as shown in FIG. 12C, commercial candidate section detector 16 regards as a commercial candidate section the stereo section where the time of the individual scene change section (or the total time of mutually adjacent scene change sections) is an integral multiple of 15 seconds. Then, commercial candidate section detector 16 outputs a control signal 1 to switch 6 in the commercial candidate section, or outputs a control signal 0 to switch 6 in any section other than the commercial candidate section.

Switch 6 is turned off in response to a control signal 1 or is turned on in response to a control signal 0. Switch 6 also receives, from modulation circuit 5, the modulated video and audio signals which are delayed for a period of one minute in delay circuit 4 to be thereby synchronized with the control signal obtained from commercial candidate section detector 16. In this way, only the video and audio signals of the program are supplied to the circuit stages after switch 6, while the video and audio signals of any commercial candidate section are not supplied thereto. Consequently, out of the entire television broadcast, the program is recorded on magnetic tape 8 without the commercial candidate sections.

Hereinafter, another embodiment of commercial candidate section detector 16 will be described. The operation of this embodiment is performed under additional conditions for detection of a commercial candidate section including a general tendency of commercials to include a plurality of scene changes.

In this exemplary operation, as shown in FIG. 13, the quiet section information (quiet[ ]), outputted from quiet section detector 13 is added to the information shown in FIG. 11 and then is stored in the internal memory of commercial candidate section detector 16. Here, 0 and 1 denote, respectively, a sound portion and a quiet section. In this case, the required capacity of the internal memory is expressed as:

60 (seconds)×30 (frames)×3 (data)×1 (bit).

Referring to the internal memory, commercial candidate section detector 16 extracts the quiet sections as shown in FIG. 14A, then extracts the scene change points as shown in FIG. 14B, subsequently partitions the scene change sections (in the case of FIG. 14C, scene change sections 0 to 10) at each scene change point in the quiet sections (known as "quiet scene change sections"), and divides, by 30, the number of the frames constituting each quiet scene change section, thereby calculating the time of the quiet scene change section.

Further, commercial candidate section detector 16 groups the quiet scene change sections in such a manner that, as shown in FIG. 14D, the time of the individual quiet scene change section or the total time of mutually adjacent quiet scene change sections becomes an integral multiple of 15 seconds, then extracts the sections where the audio multiplex mode signal is 1 as shown in FIG. 14E, and regards, as a commercial candidate section, any grouped stereo section of an integral multiple of 15 seconds (in this example, sections a to c and sections d and e of FIG. 14F).

Moreover, commercial candidate section detector 16 compares the number of scene changes in each of the commercial candidate sections (in this example, a, c, d and e) at both ends of mutually adjacent commercial candidate sections, with the predetermined threshold value (e.g., 1) as shown in FIG. 14G, and regards, as a commercial section, each of the commercial candidate sections (in this example, a and c) where the number of scene changes is greater than the threshold value. The commercial candidate section b interposed between such commercial candidate sections a and c is also regarded as a commercial section.

Commercial candidate section detector 16 outputs a control signal 1 to switch 6 in the commercial candidate section, or outputs a control signal 0 to switch 6 in any section other than the commercial candidate section.

Next, an explanation will be given of a further embodiment of commercial candidate section detector 16. When some absolute characteristic of the commercial has been altered (e.g., when the time of the commercial has been altered from an integral multiple of 15 seconds to an integral multiple of 14 seconds), this operation is performed to alter the reference value used for decision of each commercial candidate section in accordance with such alteration of the characteristic.

In this exemplary operation, commercial candidate section detector 16 partitions, with reference to the internal memory (FIG. 11), the scene change sections (in this example, scene change sections 0 to 10 as shown in FIG. 15A) at frames where the signal indicative of a scene change is 1, and then divides, by 30, the number of the frames constituting each scene change section, thereby calculating the time of the relevant section. Commercial candidate section detector 16 regards consecutive frames where the audio multiplex mode signal is 1 as a stereo section, as shown in FIG. 15B.

Thereafter, commercial candidate section detector 16 compares the time of the stereo section with the time of the other non-stereo section adjacent to the relevant stereo section, and regards the stereo section (e.g., scene change sections 1 to 4 and scene change sections 8 and 9) as a stereo section in case the time of the stereo section is sufficiently shorter. Note that in alternative embodiments, the commercial candidate section device 16 could use other criteria to detect commercial candidate section, for example, quiet scene change sections, the presence of a black or blue frame, etc.

Subsequently, since the total time of the commercial candidate sections (scene change sections 1 to 4) amounts to 56 seconds, commercial candidate section detector 16 concludes that the commercial time consists of units of 7 seconds, 14 seconds or 28 seconds. Further, as a scene change is performed at an interval of 14 or 28 seconds, commercial candidate section detector 16 finally concludes that the commercial time is an integral multiple of 14 seconds.

In case the above result (signifying that the commercial time is an integral multiple of 14 seconds) has been obtained in succession more than a predetermined number of times, commercial candidate section detector 16 concludes that the duration of commercials has been altered to an integral multiple of 14 seconds, and thereafter uses an integral multiple of 14 seconds as a reference value for detection of a commercial section.

The foregoing operation may be so modified that when some absolute characteristic of the commercial has been altered (e.g., upon above-described alteration of the commercial time or abolition of inserting a black frame or blue frame in Europe and America), the corresponding new commercial section detecting reference value is supplied from an external device to commercial candidate section detector 16. In this case, commercial candidate section detector 16 may be equipped with a rewritable recording medium such as a flash memory so that the commercial section detecting reference value can be stored therein.

Figure 16:
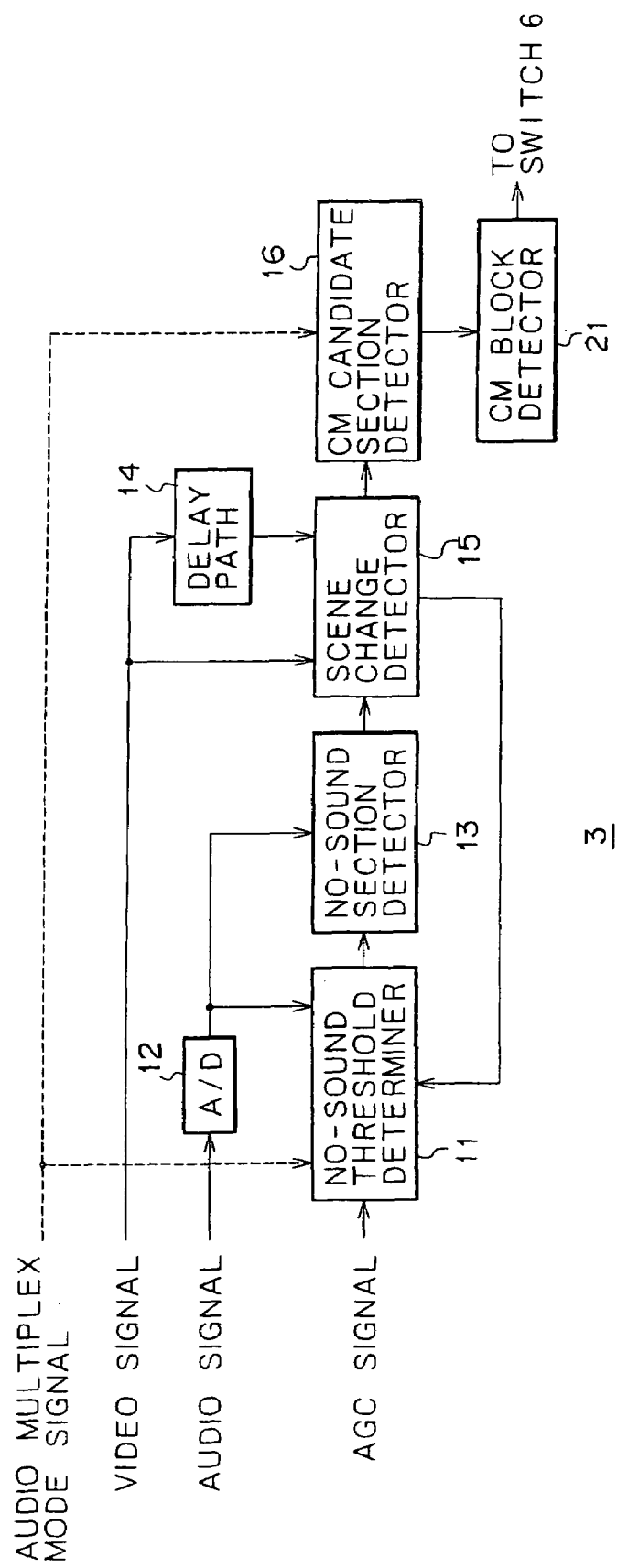
FIG. 16 is a block diagram showing a second structural example of the commercial detection circuit of FIG. 1.

Next, a second embodiment of commercial detection circuit 3 will be described with reference to FIG. 16. This structural example further includes commercial block detector 21 added to the aforementioned structural example of FIG. 2. Commercial block detector 21 detects a commercial block, which is composed of a plurality of commercials interposed between program portions, by using the number of frames of the individual commercial candidate section detected in commercial candidate section detector 16, and then outputs a control signal to switch 6 on the basis of the detection result.

According to this second embodiment, a commercial block can be detected by utilizing the following commercial characteristics. That is, when a plurality of commercials are broadcast in succession, a commercial block (composed of plural successive commercials) has an error of 3 frames or so relative to a standard number of frames, although each of the commercials has an error of 5 frames or so relative to the standard number of frames. For example, when four commercials of 15 seconds each are broadcast in succession, the number of frames of the individual commercials amounts to 450±5 (15×30±5), but the number of frames of the commercial block becomes 1800±3 instead of 1800±20 (=15×4×30±5×4).

Now the operation will be described below with reference to FIGS. 17 and 18. One skilled in the art will appreciate that use of the audio multiplex mode is an optional part of the process of detecting commercial candidate sections or commercial candidate blocks. Commercial block detector 21 reads out the frame number of each commercial candidate section a through e (sections 1+2, 3, 4, 8 and 9 of FIG. 17A) detected by commercial candidate section detector 16 and adds the frame number to the frame number of a block of adjacent commercial candidate sections (a "commercial candidate block") to judge whether the total number of frames is within a permitted range of the error (±3). Here, commercial candidate sections a through c form commercial candidate block A and commercial candidate sections d and e form commercial candidate block B. Then, commercial block detector 21 makes a decision as to whether the total number thus summed up is within the above-described allowable error range (±3) or not. If the result of this decision is affirmative, signifying that the total number of frames thus summed up is within the allowable error range, commercial block detector 21 regards the commercial candidate block as a commercial block. If the result of the above decision is negative, signifying that the total number of the frames is not within the allowable error range, commercial block detector 21 does not regard the commercial candidate block as a commercial block.

In this case, the total number of frames of commercial candidate block A (commercial candidate sections a, b and c) amounts to 1803 (=453+446+904) as shown in FIG. 17, and the error (3) thereof to the standard number of frames (60 seconds×30 frames=1800) is within the allowable range, so that commercial candidate block A (quiet scene change sections 1 to 4) is regarded as a commercial block. In this instance, the time of sections 1 and 2 individually is not an integral multiple of 15 seconds, but the total time of these adjacent sections is 15 seconds, so they are regarded as a commercial candidate section.

The total number of frames of commercial candidate block B (commercial candidate sections d and e) amounts to 910 (455+455), and the error (10) thereof to the standard number of frames (30 seconds×30 frames=900) is beyond the allowable range, so that commercial candidate block B is not regarded as a commercial block.

When commercial candidate sections shown in FIG. 18B are inputted from commercial candidate section detector 16, commercial block detector 21 regards commercial candidate sections a, b and c as a commercial candidate block A as in the aforementioned case of FIG. 17, and also regards commercial candidate sections d through g as a commercial candidate block B. Because commercial candidate block A has 1803 frames, which is within the 3-frame tolerance, commercial candidate block A is regarded as a commercial block. Similarly, because commercial candidate block B has 1801 frames, which is within the 3-frame tolerance, commercial candidate block B is regarded as a commercial block.

Further, commercial block detector 21 reads, from commercial candidate section detector 16, the number of frames of the sections (quiet scene change sections 5 and 6) which are interposed between commercial blocks A and B and are not commercial candidate sections. If the number of frames (in this example, 150) is less than a predetermined threshold value (e.g., 300 frames), commercial block detector 21 judges that these sections are not the program and are similar to a commercial from the perspective of the viewer, and then includes such sections with the preceding and following commercial blocks A and B. More specifically, commercial block detector 21 regards the quiet scene change sections 1 to 10 as one commercial block, as shown in FIG. 18D.

Commercial block detector 21 outputs a control signal 1 to switch 6 in the commercial block and outputs a control signal 0 to switch 6 in any section other than the commercial block.

Figure 19:
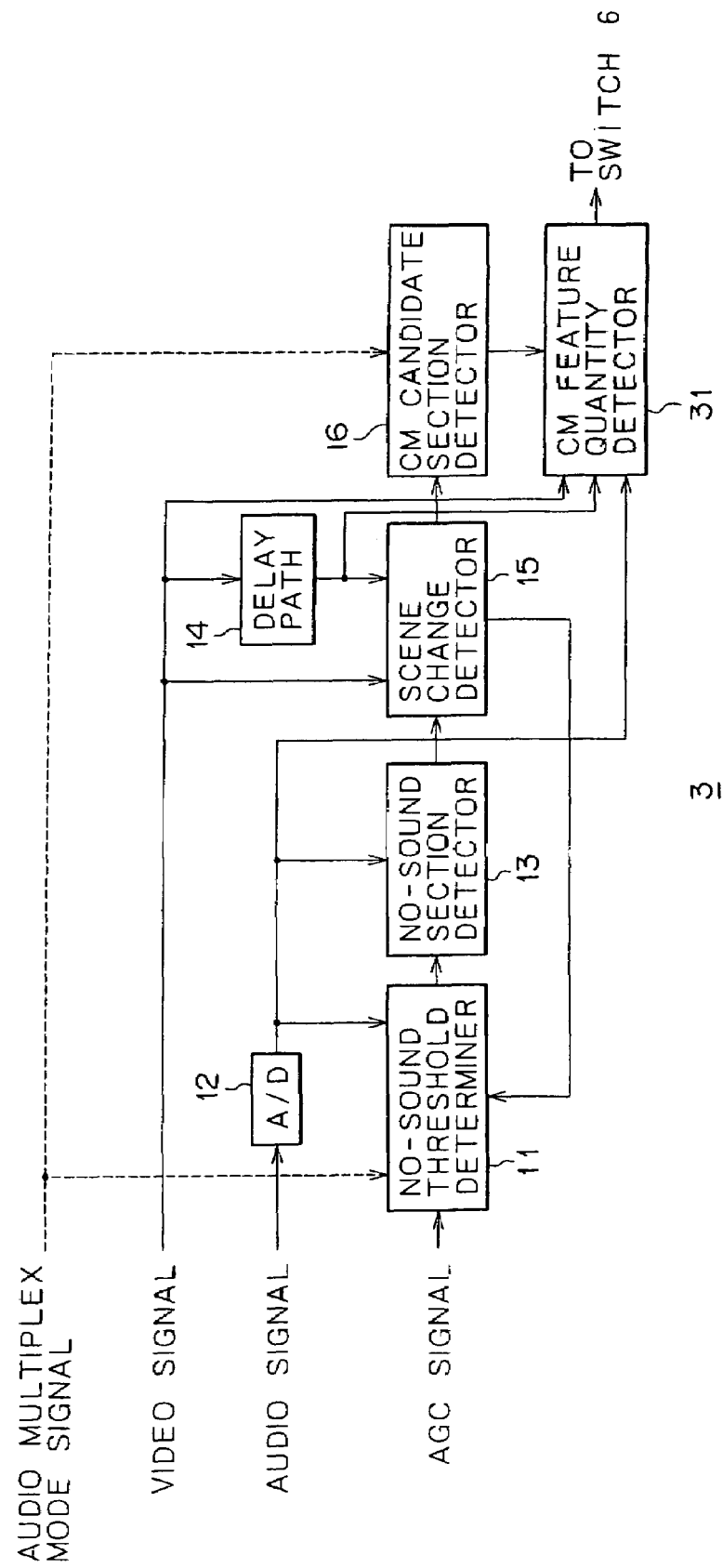
FIG. 19 is a block diagram showing a third structural example of the commercial detection circuit of FIG. 1.

Next, a third embodiment of commercial detection circuit 3 will be described with reference to FIG. 19. This structural example further comprises commercial characteristic quantity detector 31 added to the aforementioned first structural example of FIG. 2. Commercial characteristic quantity detector 31 receives the two successive frame images (video signal), the digitized audio signal, the information (e.g., as shown in FIG. 11) stored in the internal memory of commercial candidate section detector 16, and information regarding the commercial candidate sections detected by commercial candidate section detector 16. Commercial characteristic quantity detector 31 makes a decision as to whether the information thus supplied has various commercial characteristics or not and then detects commercial sections in accordance with the result of this decision. Further, commercial characteristic quantity detector 31 outputs a control signal to switch 6 in conformity with the detection result.

Now the operation of commercial characteristic quantity detector 31 will be described below with reference to a flowchart of FIG. 20. This processing routine of characteristic quantity detection is executed with respect to each of the commercial candidate sections detected by commercial candidate section detector 16. Although commercial characteristic quantity detector 31 is described below as having detection, adding and judging functions, these functions could be performed by separate elements.

In the embodiment described below, commercial characteristic quantity detector 31 assigns the same value to each commercial characteristic. However, these values could be varied to indicate that some commercial characteristics are more likely than others to be associated with a commercial. For example, the telop detection of step S46 and the character detection of step S47 could be assigned a higher value than other commercial characteristics. Moreover, any of the characteristics used to detect or verify commercial candidate sections could also be used by commercial characteristic quantity detector 31, e.g., the number frames of a commercial candidate section, the total number of frames of a commercial candidate group, the presence of quiet scene change sections or the state of the audio multiplex mode.

At step S41, commercial characteristic quantity detector 31 initializes a commercial characteristic value to zero. At step S42, commercial characteristic quantity detector 31 counts the scene changes in the commercial candidate sections inputted from commercial candidate section detector 16 and decides whether the number of scene changes is more than a predetermined threshold value (e.g., 5 changes per 15 seconds). If the result of this decision is affirmative, signifying that the number of scene changes is more than the predetermined threshold value, 1 is added to the commercial characteristic value. If the result of the above decision is negative, signifying that the number of the counted scene changes is less than the predetermined threshold value, nothing is added to the commercial characteristic value. This routine is based on the observation that in general, there are frequent scene changes in a commercial.

At step S43, commercial characteristic quantity detector 31 detects the periodicity of the audio signal in the commercial candidate section. This routine for detecting the periodicity of the audio signal is based on the observation that in general, repeated phrases of background music (for example, "jingles") are used in commercials. In the periodicity detection step, the rhythm of background music may also be detected.

Figures 22A, 22B:
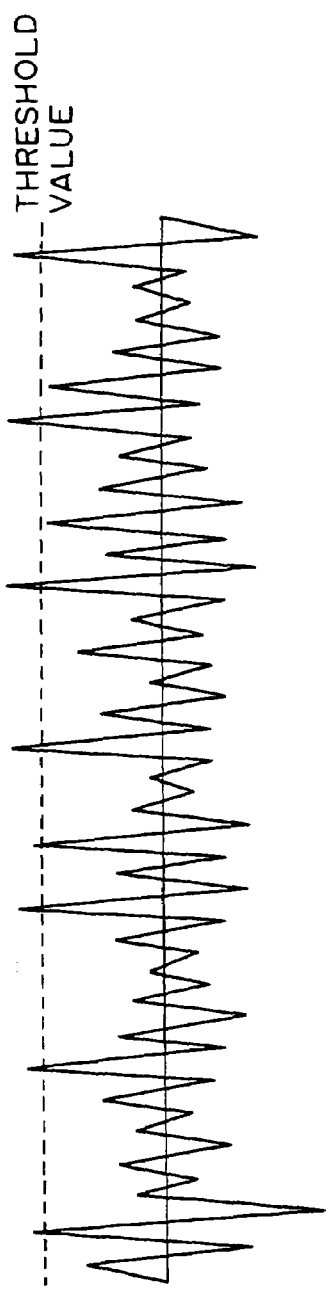
FIGS. 22A and 22B are diagrams for explaining a routine of audio signal periodicity detection.

This routine for detection of audio signal periodicity will be described below with reference to the flowchart of FIG. 21. At step S61, as shown in FIG. 22, commercial characteristic quantity detector 31 detects, as a peak, any point where the level of the audio signal inputted from A/D converter 12 is higher than a predetermined threshold value (FIG. 22B). FIG. 22A shows the audio signal in an analog form.

At step S62, commercial characteristic quantity detector 31 makes a decision as to whether the periodicity of the peaks detected at step S61 is longer than a predetermined period, which is generally on the order of several seconds. Periodicity may be determined by means of a Fast Fourier Transform ("FFT"), for example, or by simply measuring the intervals between the peaks. If the result of the above decision signifies that the periodicity of the detected peaks is longer than the predetermined period, the operation proceeds to step S63.

At step S63, commercial characteristic quantity detector 31 adds 1 to the commercial characteristic value.

If the result of the decision at step S62 signifies that the periodicity of the detected peaks is not longer than the predetermined period, nothing is added to the commercial characteristic value, so that step S63 is skipped.

Figure 23:
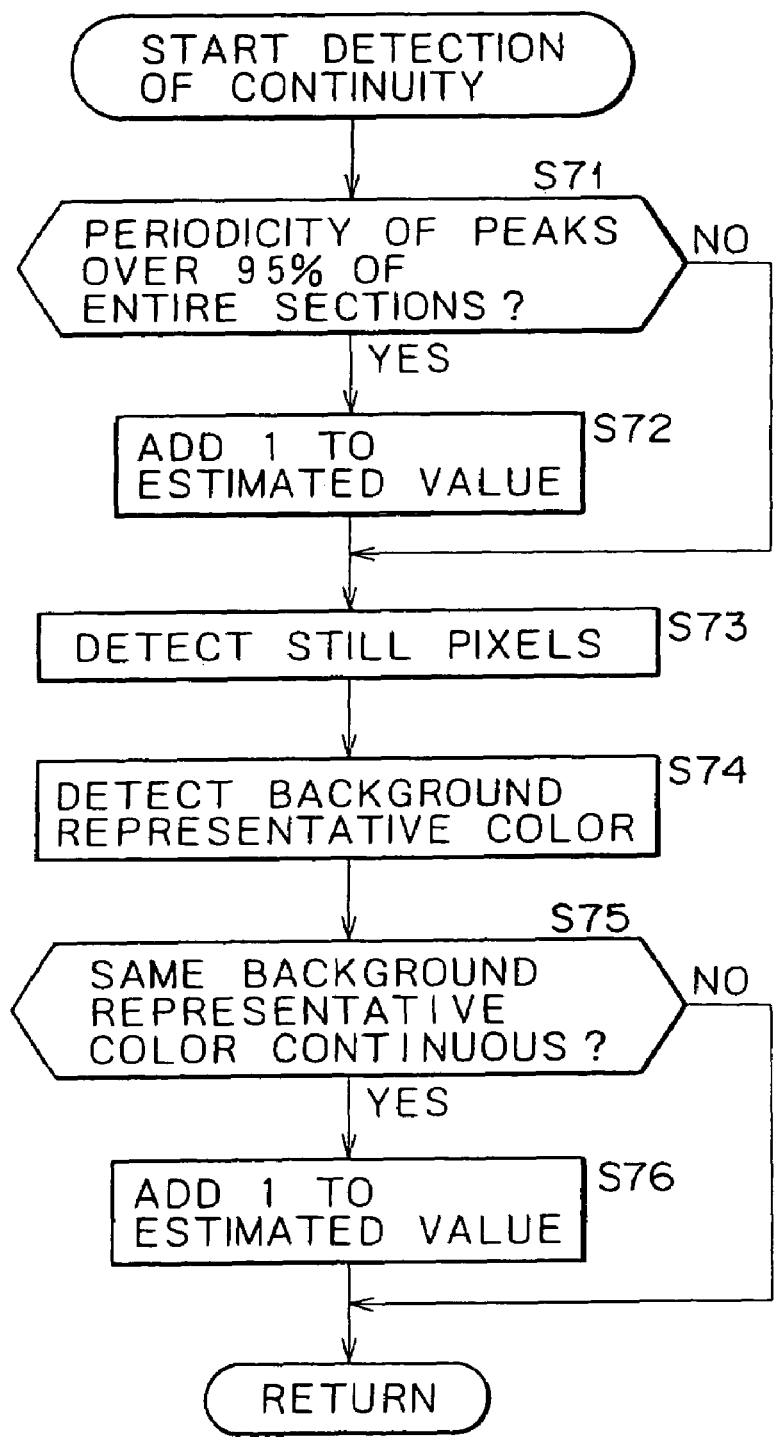
FIG. 23 is a flowchart for explaining a routine of continuity detection executed at step S44 of FIG. 20.

The operation then returns to step S44 in FIG. 20. At step S44, commercial characteristic quantity detector 31 detects the continuity of the audio signal and the video signal in the commercial candidate sections. This routine for detecting the signal continuity will now be described with reference to a flowchart of FIG. 23.

At step S71, commercial characteristic quantity detector 31 makes a decision as to whether the periodicity of the audio signal peaks is continuous for a time longer than 95% of the duration of the commercial candidate section. Measuring the continuous duration of the peak periodicity is performed on the basis of the aforementioned information obtained at step S43. If the result of the decision at step S71 signifies that the periodicity of the audio signal peaks is continuous for a time longer than 95% of the duration of the commercial candidate section, the operation proceeds to step S72.

Then at step S72, commercial characteristic quantity detector 31 adds 1 to the commercial characteristic value.

If the result of the decision at step S71 is negative, signifying that the periodicity of the audio signal peaks is not continuous for a time longer than 95% of the duration of the commercial candidate section, nothing is added to the commercial characteristic value, so that step S72 is skipped.

At step S73, commercial characteristic quantity detector 31 calculates the differences between the values of mutually corresponding pixels in the two successive images, and detects any pixels where the difference is less than a predetermined threshold value, i.e., the pixels without motion between the two images. At step S74, commercial characteristic quantity detector 31 produces histograms of the pixel values detected at step S73, and then detects the pixel value indicative of the maximum as a representative color of the background. The processes at steps S73 and S74 are executed repeatedly at a predetermined interval in the commercial candidate section.

At step S75, commercial characteristic quantity detector 31 refers to the representative background color or colors detected at step S74, and makes a decision as to whether the same pixel value is being detected continuously as the representative background color. If the result of this decision is affirmative, signifying that the same pixel value is being detected continuously as the representative background color, the operation proceeds to step S76.

Subsequently at step S76, commercial characteristic quantity detector 31 adds 1 to the commercial characteristic value.

In case the result of the decision at step S75 signifies that the same pixel value is not detected continuously as the representative background color, nothing is added to the commercial characteristic value, so that step S76 is skipped.

Thereafter, the operation returns to step S45 in FIG. 20. At step S45, commercial characteristic quantity detector 31 detects image repetition. This routine for detection of image repetition is based on the observation that in a commercial, the same images are generally repeated. For example, a 15-second commercial for ketchup may be composed of a scene of green forest (3 seconds), a scene of blue sky (2 seconds), a scene of green forest (2 seconds), a scene of red ketchup (3 seconds), a scene of green forest (2 seconds) and a scene of red ketchup (3 seconds).

Figure 24:
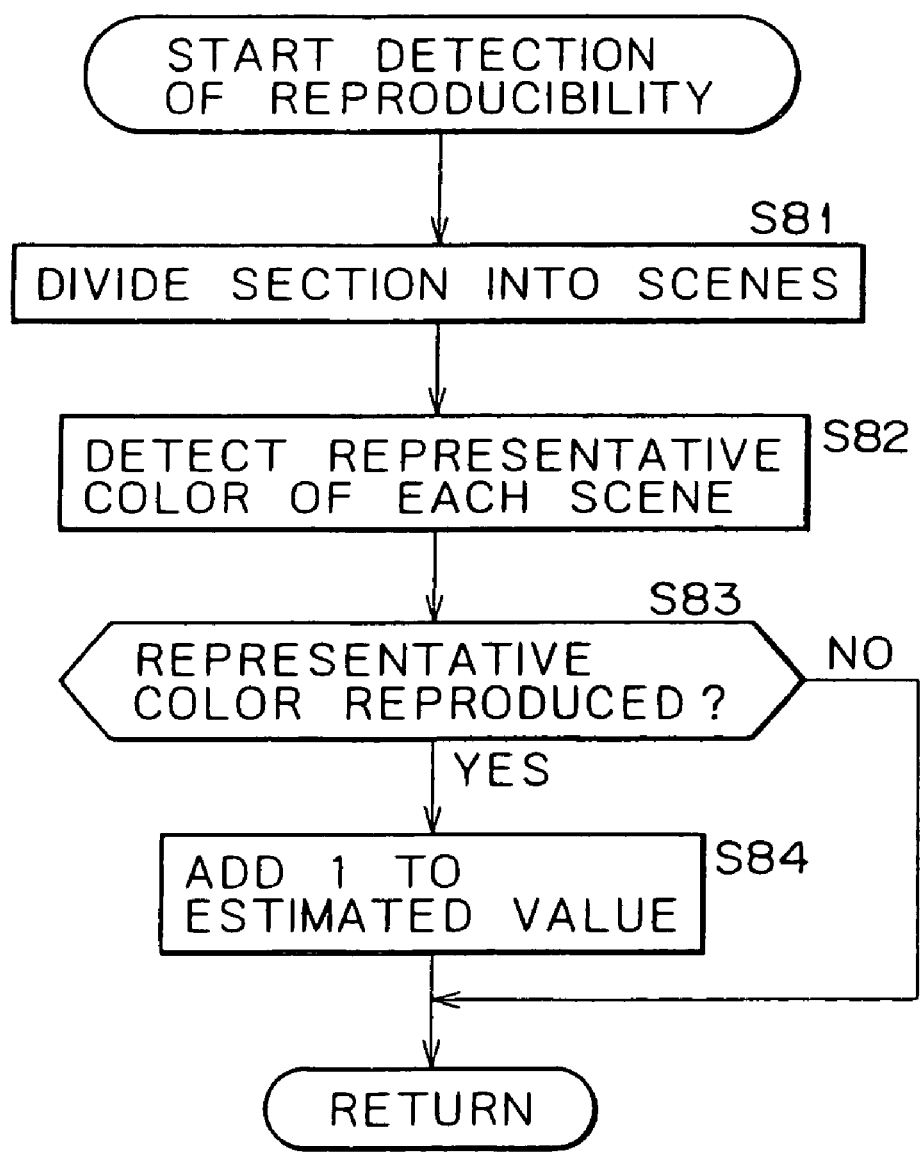
FIG. 24 is a flowchart for explaining a routine of repetition detection executed at step S45 of FIG. 20.

This routine for detection of the image repetition will now be described with reference to the flowchart of FIG. 24. At step S81, commercial characteristic quantity detector 31 divides the commercial candidate section at scene change points. At step S82, commercial characteristic quantity detector 31 produces 16-gradation histograms of the pixel values of each scene divided at step S81, and then detects the pixel value, which indicates the maximum, as a representative color of the relevant scene.

At step S83, commercial characteristic quantity detector 31 makes a decision as to whether the representative color of the scene is repeated in the commercial candidate section (whether the same representative color is detected in the other scene). If the result of this decision is affirmative, signifying that the representative color of the scene is repeated, the operation proceeds to step S84.

At step. S84, commercial characteristic quantity detector 31 adds 1 to the commercial characteristic value.

If the result of the decision at step S83 is negative, signifying that the representative color of the scene is not repeated, nothing is added to the commercial characteristic value, so that step S84 is skipped. One skilled in the art will appreciate that the histograms described above could have more or less than 16 gradations. In addition, alternative embodiments of the process of detecting image repetition could determine different representative colors for different portions of the image.

Figure 26A:
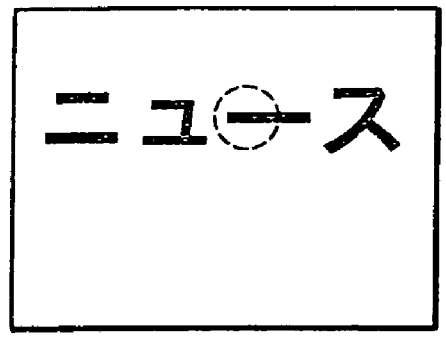
FIGS. 26A to 26C are diagrams for explaining a routine of telop detection.

Thereafter, the operation returns to step S46 in FIG. 20. At step S46, commercial characteristic quantity detector 31 detects a "telop" (which could be a logo, a graphic, a mark, a slogan, or the like), an example of which is shown in FIG. 26A. This routine for detection of a telop is based on the observation that a telop is often displayed at the end of a commercial. However, in alternative embodiments, this routine could be modified to search for a telop at any part of a commercial candidate section.

Figure 25:
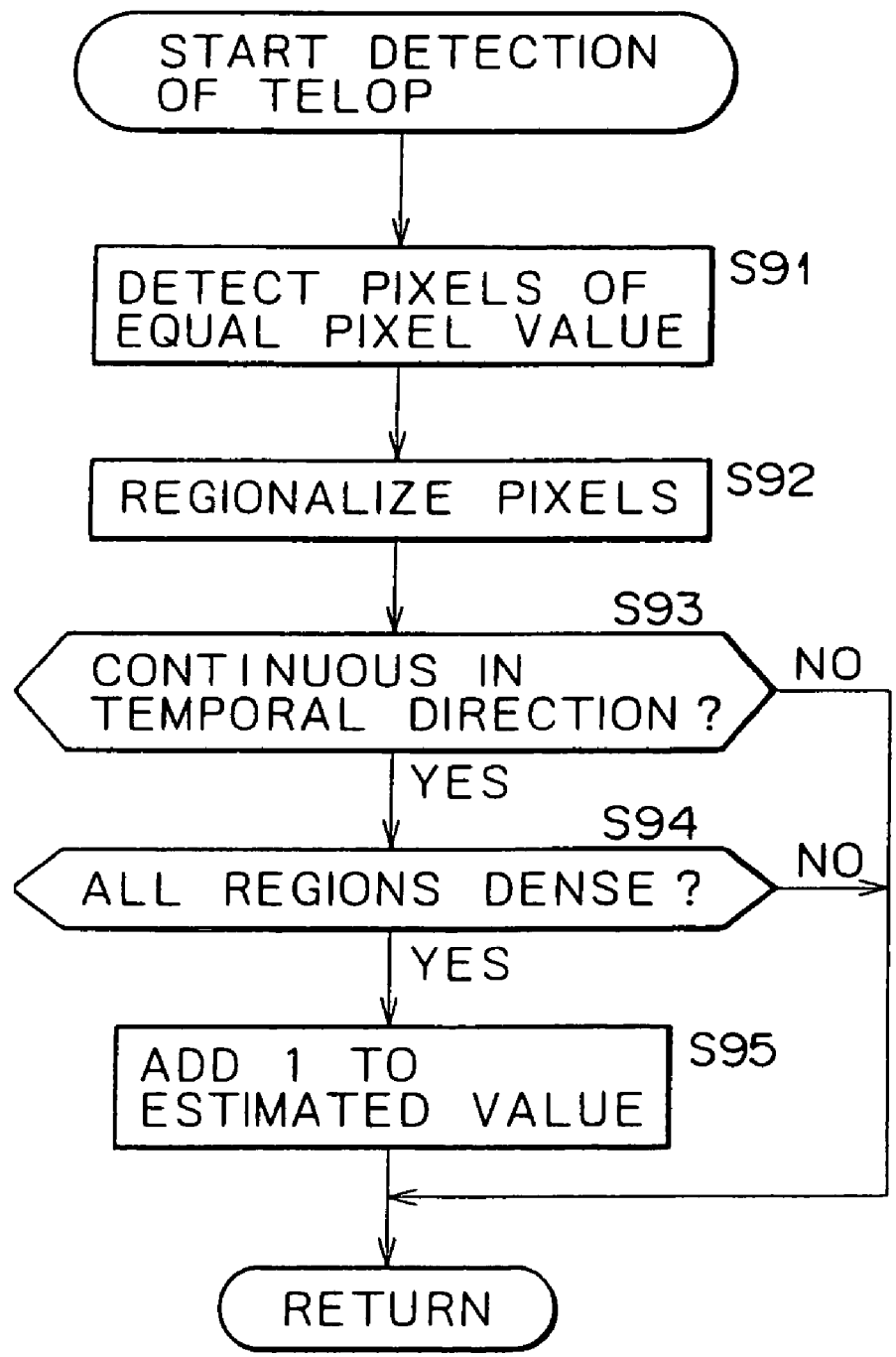
FIG. 25 is a flowchart for explaining a routine of telop detection executed at step S46 of FIG. 20.
Figure 26B:
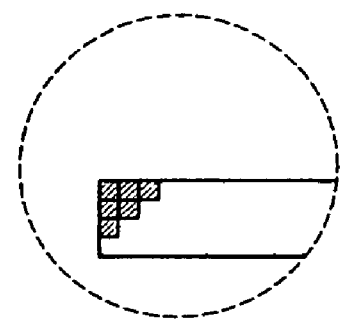

Now the routine for detection of a telop will be described below with reference to the flowchart of FIG. 25. At step S91, commercial characteristic quantity detector 31 detects, in each frame image of a predetermined time (e.g., 5 seconds) at the end of the commercial candidate section, adjacent pixels which exceed a predetermined number and have an equal pixel value as shown in FIG. 26B.

Figure 26C:
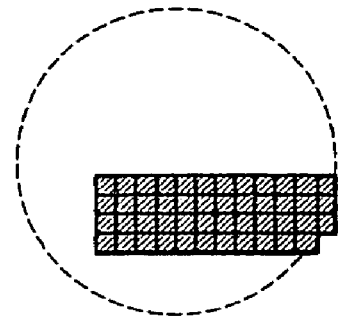

At step S92, commercial characteristic quantity detector 31 searches for and regionalizes the pixels having the same pixel value as that of the pixels detected at step S91, as shown in FIG. 26C.

At step S93, commercial characteristic quantity detector 31 makes a decision as to whether the regions obtained at step S92 are continuous in time (whether the same regions are existent in successive frames). If the result of this decision is affirmative, signifying that the regions are continuous in time, the operation proceeds to step S94.

At step S94, commercial characteristic quantity detector 31 detects the centroids of all regions on the image, then calculates the average value of the distances between the centroids and the individual points in the regions. Commercial characteristic quantity detector 31 compares this average value with a predetermined threshold value and makes a decision as to whether the regions are dense. If the result of this decision is affirmative, signifying that the regions are dense, the operation proceeds to step S95.

At step S95, commercial characteristic quantity detector 31 adds 1 to the commercial characteristic value.

If the result of the decision at step S93 is negative, signifying that the regions are not continuous in time, nothing is added to the commercial characteristic value and step S95 is skipped.

The operation returns to step S47 in FIG. 20. At step S47, commercial characteristic quantity detector 31 makes a decision, by the same method as that used in the foregoing routine for detection of a telop, as to whether characters on the image (which may or may not be part of a telop) are existent for more than a predetermined time in the entire section from the start of the commercial candidate section to the end thereof. If the result of this decision is affirmative, signifying that the characters on the image are existent for more than the predetermined time, 1 is added to the commercial characteristic value. If the result of the above decision is negative, signifying that the characters on the image are not existent for more than the predetermined time, nothing is added to the commercial characteristic value. This processing routine is based on a general characteristic that characters are often displayed in a commercial.

Figure 27:
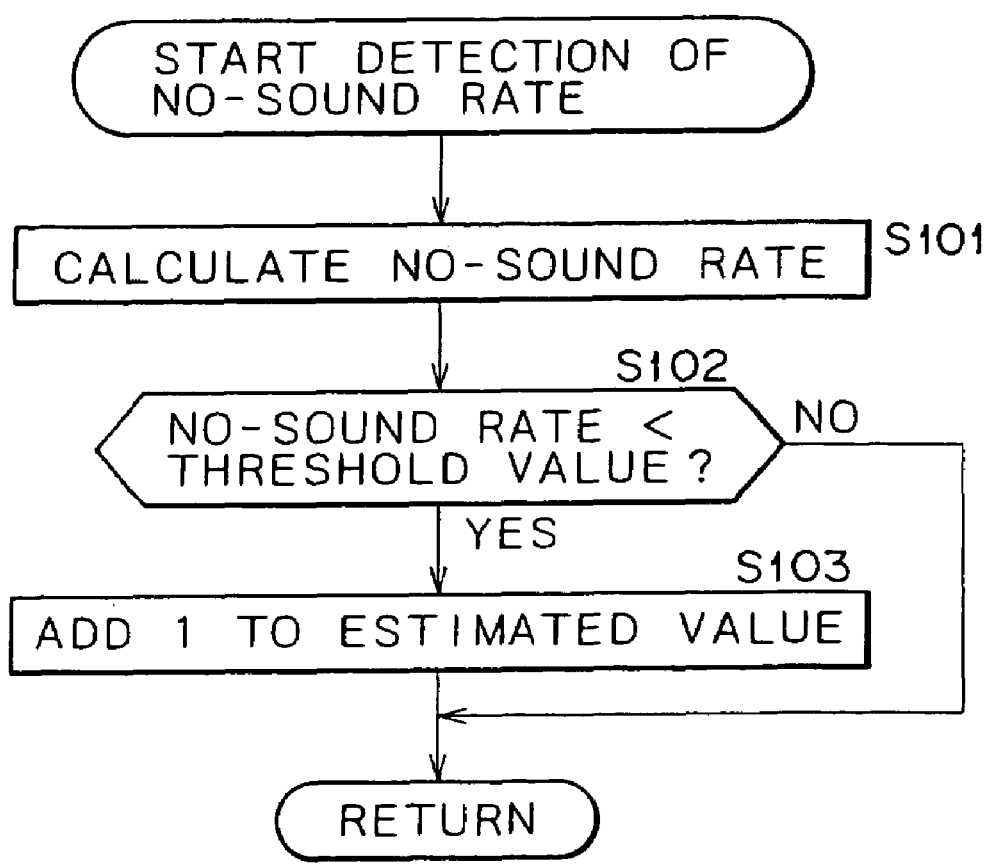
FIG. 27 is a flowchart for explaining a routine of quietness rate detection executed at step S48 of FIG. 20.

At step S48, commercial characteristic quantity detector 31 detects a quiet section rate in any other portion than the start and end points of the commercial candidate section. This processing routine for detection of a quietness rate is based on a general characteristic that quiet sections are rare in a commercial. This routine for detection of a quietness rate will be described below with reference to the flowchart of FIG. 27.

Figure 28:
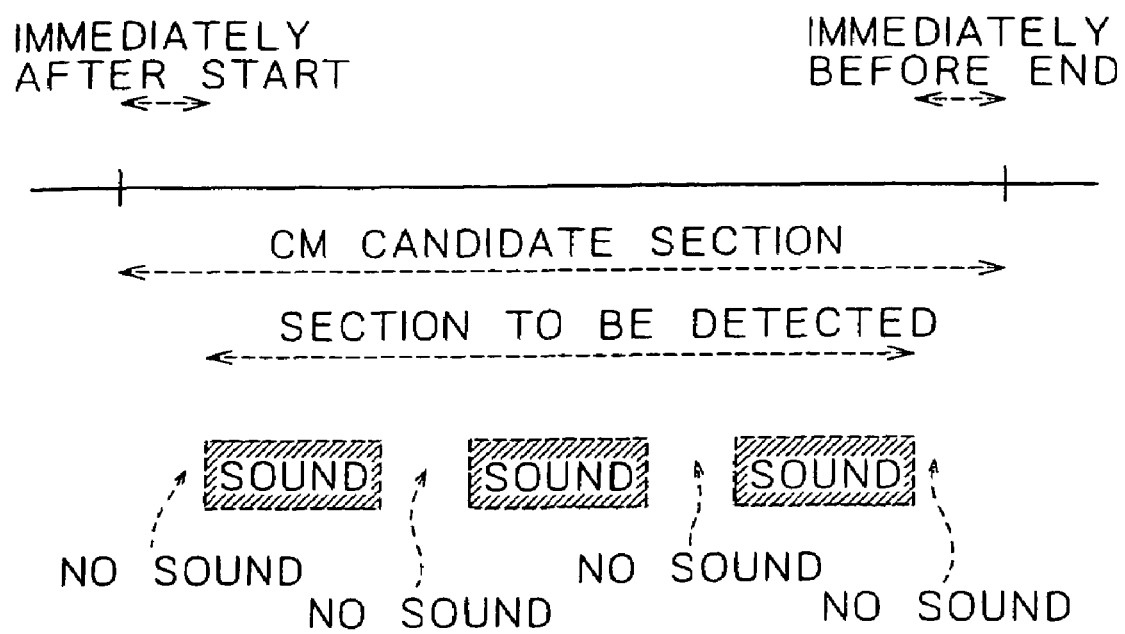
FIG. 28 is a diagram for explaining a routine of quietness rate detection.

At step S101, commercial characteristic quantity detector 31 reads out the information (e.g., the information shown in FIG. 11) stored in the internal memory of commercial candidate section detector 16, and detects the number of quiet section frames other than the start and end points of the commercial candidate section, as shown in FIG. 28. Commercial characteristic quantity detector 31 divides the number of the detected quiet section frames by the total number of frames constituting the commercial candidate section, thereby calculating the quietness rate.

At step S102, commercial characteristic quantity detector 31 makes a decision as to whether the quietness rate calculated at step S101 is lower than a predetermined threshold value or not. If the result of this decision is affirmative, signifying that the quietness rate is lower than the predetermined threshold value, the operation proceeds to step S103.

At step S103, commercial characteristic quantity detector 31 adds 1 to the commercial characteristic value.

If the result of the decision at step S102 is negative, signifying that the quietness rate is not lower than the predetermined threshold value, nothing is added to the commercial characteristic value, so that step S103 is skipped.

Then the operation returns to step S49 in FIG. 20. At step S49, commercial characteristic quantity detector 31 makes a decision as to whether the commercial characteristic value is greater than a predetermined threshold value. If the result of this decision is affirmative, signifying that the commercial characteristic value is greater than the predetermined threshold value, the operation proceeds to step S50. At step S50, commercial characteristic quantity detector 31 regards the commercial candidate section as a commercial section.

In case the result of the decision at step S49 signifies that the commercial characteristic value is not greater than the predetermined threshold value, the operation proceeds to step S51. Then at step S51, commercial characteristic quantity detector 31 concludes that the commercial candidate section is not a commercial section.

In conformity with the result of the above conclusion, commercial characteristic quantity detector 31 outputs a control signal 1 to switch 6 in the commercial section and outputs a control signal 0 to switch 6 in any other section than the commercial section.

As described above, according to the video recorder (FIG. 1) representing an exemplary embodiment of the present invention, only the program in a television broadcast is recorded on magnetic tape 8, while the commercial included in the broadcast is not recorded. Consequently, when magnetic tape 8 is reproduced, only the program is displayed.

Figure 29:
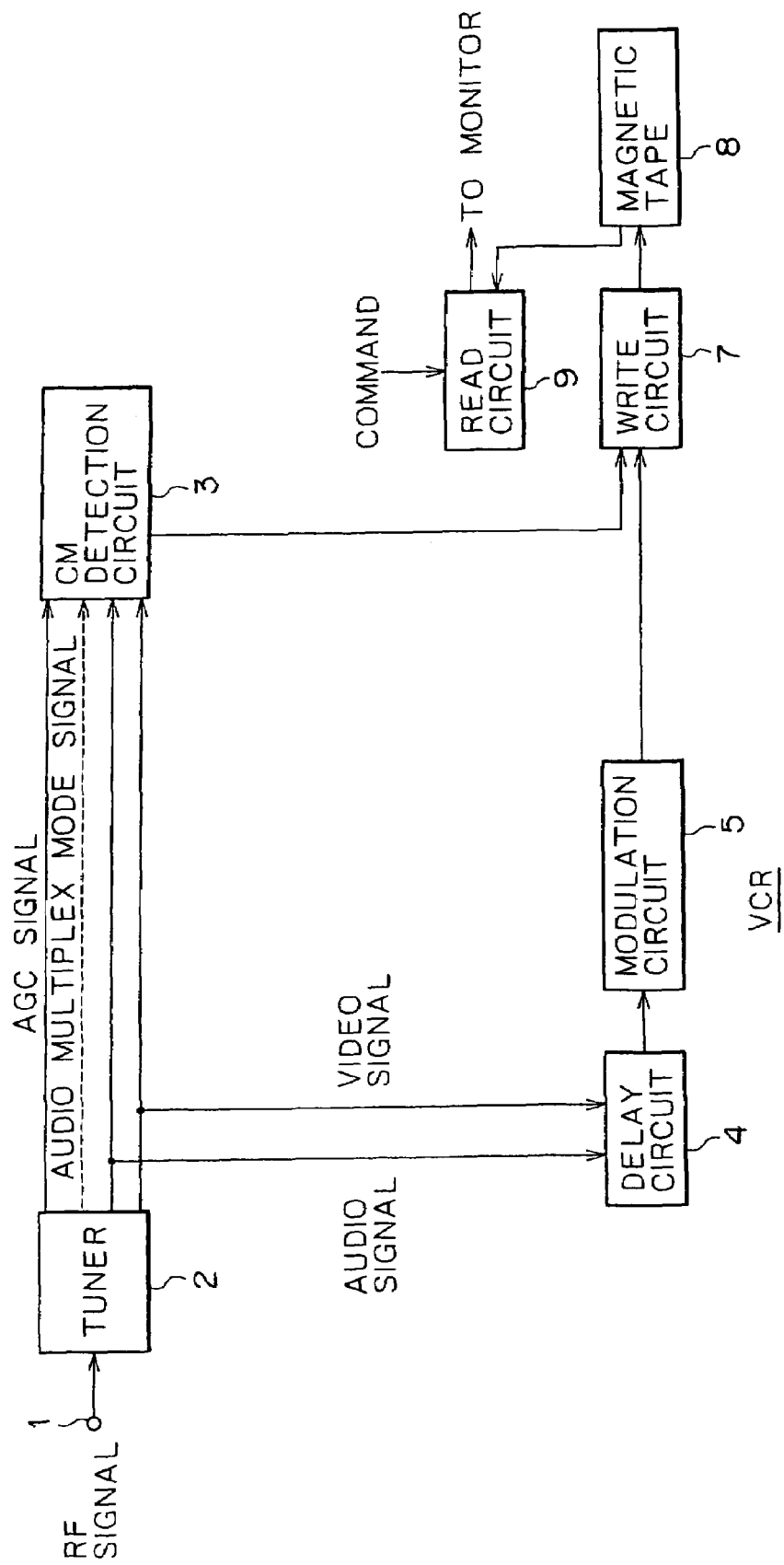
FIG. 29 is a block diagram showing a second structural example of a video recorder where the present invention is applied.

It is observed that some users want to record a commercial as well although skipping the same in a reproduction mode by fast-forwarding or the like. A second embodiment of a video recorder designed to address this need by adopting the present invention will now be described below with reference to FIG. 29. In this second embodiment, switch 6 used in the aforementioned structure of FIG. 1 is deleted, and the result of the commercial detection performed in commercial detection circuit 3 is supplied to write circuit 7.

In the recording unit of the second embodiment, write circuit 7 records, on magnetic tape 8, all of the video and audio signals (of both the programs and the commercials of a television broadcast) inputted from modulation circuit 5, and also records information relative to the commercial (e.g., the temporal positions of the commercial) at predetermined positions of magnetic tape 8, on the basis of the information obtained from commercial detection circuit 3.

In the reproducing unit of this embodiment, read circuit 9 responds to a commercial elimination command inputted from the user for reproducing only the program, then demodulates only the program while eliminating the commercial (by fast-forwarding or the like) on the basis of the commercial information recorded at the predetermined positions of magnetic tape 8, and supplies the same to a monitor (not shown).

It is to be understood that the presently-claimed invention is applicable not merely to a video recorder alone, but also to a television receiver, a tuner and so forth. Alternatively, the presently-claimed invention could be embodied as an add-on to be used with (but could be sold separately from) an existing video recorder, television receiver or tuner.

A computer program for executing the above processing routines may be provided to users via an adequate provision medium which could consist of an information recording medium such as magnetic disk or CD-ROM, or via a network provision medium such as the Internet, a digital satellite or the like.

Thus, according to the present invention, commercial candidate sections are detected and then a commercial block is formed out of the detected plural commercial candidate sections, hence achieving exact detection of the commercial included in a television broadcast.

Although only certain embodiments have been described in detail, those having ordinary skill in the art will certainly understand that many modifications are possible without departing from the teachings thereof. All such modifications are intended to be encompassed within the following claims.

We claim:

1. An apparatus for processing data comprising audio and video signals, wherein said data includes a commercial message, said apparatus comprising:

commercial message candidate section detecting means for detecting commercial message candidate sections in said data;

a first measuring means for measuring a length of each commercial message candidate section;

a first judgment means for making a first judgment of whether the length of each commercial message candidate section is within a first predetermined range of an integral multiple of a standard length;

a second measuring means for measuring the length of an intermediate section between the commercial message candidate sections that are judged by the first judgment means;

a second judgment means for making a second judgment of whether the length of the intermediate section is within a second predetermined range; and commercial message block determining means for determining a commercial message block of one or more commercial message candidate sections according to the first judgment and the second judgment.

2. An apparatus for processing data comprising audio and video signals, wherein said data includes a commercial message, said apparatus comprising:

commercial message extracting means for extracting at least one commercial message based on a reference criterion indicative of a commercial message characteristic;

alteration detecting means for detecting an alteration of the commercial message characteristic, wherein the alteration detection means measures a total length of the at least one commercial message and compares the total length to integral multiples of a standard length to detect the alteration of the commercial message characteristic; and changing means for changing the reference criterion according to the alteration of the commercial message characteristic detected by said alteration detecting means.

3. An apparatus for processing data comprising audio and video signals, wherein said data includes a commercial message, said apparatus comprising:

a detector for detecting commercial message candidate sections in said data;

a measuring circuit for measuring a length of each commercial message candidate section and for measuring a length of an intermediate section between commercial message candidate sections;

a first comparator for making a first comparison of whether the length of each commercial message candidate section is within a first predetermined range of an integral multiple of a standard length;

a second comparator for making a second comparison of whether the length of the intermediate section that is not judged as a commercial candidate section by the first comparator is within a second predetermined range; and a commercial message block detector for detecting a commercial message block of one or more commercial message candidate sections according to the first judgment and the second judgment.

4. An apparatus for processing data comprising audio and video signals, wherein said data includes a commercial message, said apparatus comprising:

a commercial message extracting circuit for extracting at least one commercial message based on a reference criterion indicative of a commercial message characteristic;

a detector for detecting an alteration of the commercial message characteristic, wherein the detector measures a total length of the at least one commercial message and compares the total length to integral multiples of a standard length to detect the alteration of the commercial message characteristic; and a controller for changing the reference criterion according to the alteration of the commercial message characteristic detected by said detector.

5. The apparatus of claim 2, wherein the alteration detecting means includes means for detecting an alteration of a standard length of the commercial message.

* * * * *